United States Patent [19]
Wada et al.

[11] Patent Number: 5,801,745
[45] Date of Patent: Sep. 1, 1998

[54] APPARATUS AND METHOD FOR PERFORMING A PHOTOGRAPHIC PRINTING

[75] Inventors: Ryukichi Wada; Fumio Suzuki; Yoshisuke Ohtsuru, all of Nagaokakyo, Japan

[73] Assignee: Mitsubishi Denki Kabushiki Kaisha, Tokyo, Japan

[21] Appl. No.: 492,757

[22] Filed: Jun. 21, 1995

[30] Foreign Application Priority Data

Jun. 30, 1994 [JP] Japan .................. 6-149754

[51] Int. Cl.$^6$ ........................................ B41J 2/47
[52] U.S. Cl. .............................. 347/232; 347/240
[58] Field of Search ................... 347/232, 240, 347/251, 115, 131, 253, 254; 358/298, 521, 528; 395/109

[56] References Cited

U.S. PATENT DOCUMENTS

| 3,646,262 | 2/1972 | Moe | 358/298 |
| 4,656,505 | 4/1987 | Yamada et al. | 358/521 |

FOREIGN PATENT DOCUMENTS 5-56263  3/1993  Japan.

OTHER PUBLICATIONS

Agui et al., "Real Color Hard Copy," 1993, p. 103, Table II3.5 no month.

*Primary Examiner*—Mark J. Reinhart

[57] ABSTRACT

Apparatus and method for performing a photographic printing in which photographic signals are separated into a black signal and a chrominance signal and gradating is performed on each one of the black signal and the chrominance signal.

42 Claims, 14 Drawing Sheets

BRIGHT ⟵⟶ DARK (PHOTOGRAPHIC PRINTING DOT)

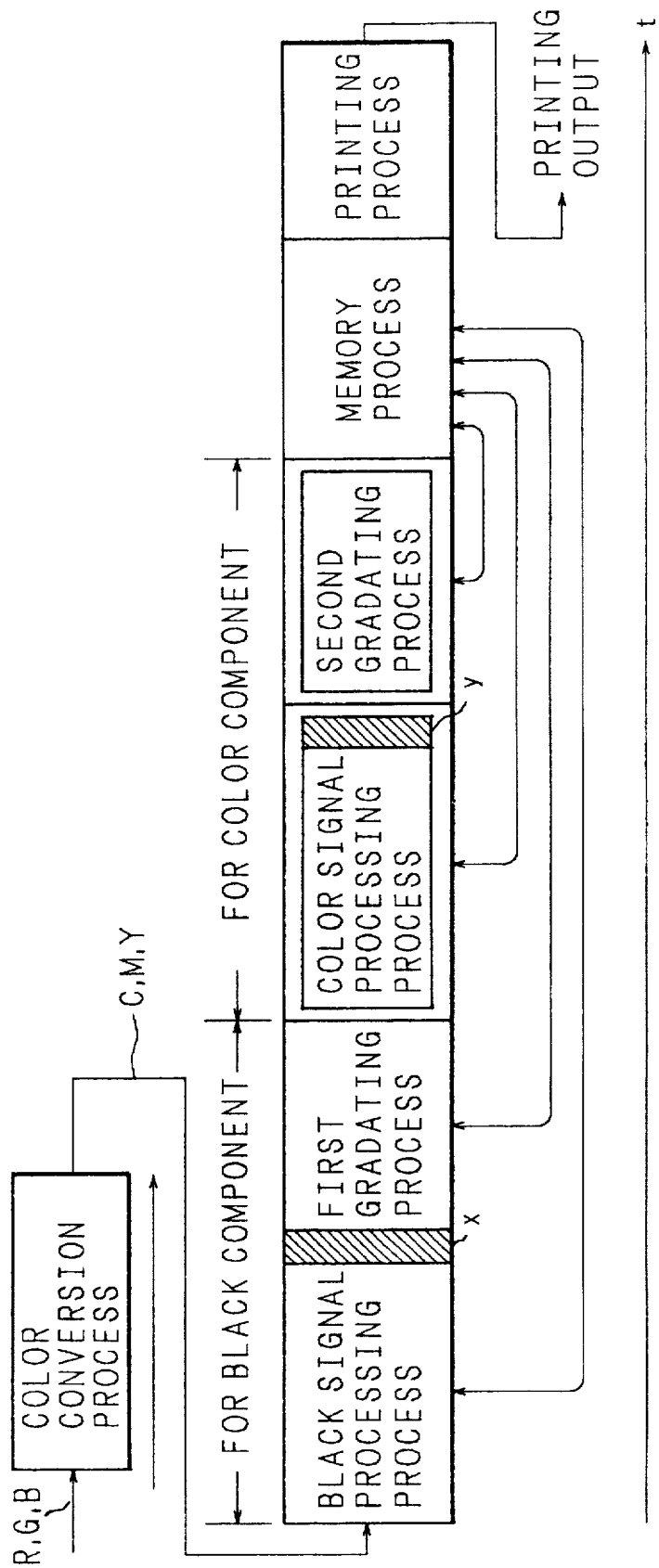

APPARATUS AND METHOD FOR PERFORMING A PHOTOGRAPHIC PRINTING

BACKGROUND OF THE INVENTION

1. Field of the Invention

The present invention relates generally to a photographic printing system such as a color printer. More particularly, it relates to an apparatus and method for performing a photographic printing which enhances the color reproducibility and resolution particularly in a three-primary-color material which produces a color image and an achromatic material which produces a Chinese ink component (hereinafter referred to as inking component) on a photographic printing paper, by correlating a frequency of an image to a photographic printing dot size, which forms a pixel affecting a depth of the photographic dot density distribution and the resolution, and the size of each pixel, even when a binary color material and a binary transfer or photographic printing means, i.e., a printer are used.

2. Description of the Background Art

The conventional photographic printing method of this type is summarized as follows:

Since a binary printer, such as an ink jet printer, which prints letters and images by injecting an ink, and a thermal fusion printer, which uses a binary ink sheet and a thermal head, in general use a so-called binary printing means having a binary function (e.g., injecting or not injecting an ink, or fuse-adhering or not fuse-adhering an ink), the printing method must be improved regarding the various aspects in order to express a half tone color. Among conventional methods used to express a half tone color, namely, an intermediate gradation, are a Dither method (which is known as a conventional method which intentionally supplies a predetermined random signal or a random print pattern to a signal part or a print part which needs a half tone color) and a pseudo gradation method (in which a predetermined block is divided by a predetermined number, e.g., 4×4=16, to change a density distribution in one dot of a photographic printing element in a simple manner including the number and the arrangement of the dots to be printed). However, these conventional methods have a problem in that pseudo gradation, which was not originally existent, is created. The pseudo graduation deteriorates the gradation reproducibility and has a resolution which is naturally poor. Thus, the conventional methods for obtaining an intermediate gradation are not satisfactory since an intermediate gradation, the gradation reproducibility and resolution are incompatible with each other.

This will be described with reference to FIGS. 1 and 2. FIGS. 1 and 2 show a model of a gradation for one pixel. FIG. 1 shows a case in which a gradation is expressed by a pseudo gradation which is obtained by a density change method, i.e., by changing a density distribution as mentioned earlier by a conventional binary printer to which the present invention relates. FIG. 2 shows a gradation which is produced by a direct density method by a so-called multi-value printer, e.g., a sublimation printer which uses a sublimation black sheet and a thermal head, which prints a multigradation with a sublimation ink and a thermal head to be controlled at an energizing time. In each example, a gradation is 16+1=17, and a reproducibility of a gradation is deeply related to a depth of this gradation; while a resolution is deeply related to the size of one dot of a plurality of photographic printing element dots which form one pixel size, and also to the size of one pixel which is formed by those photographic printing dots. A detailed description is as given below.

In the direct density method of FIG. 2, which changes the density of an ink in one photographic printing dot, since each photographic printing dot itself directly expresses a gradation, the size of the smallest printed pixel is approximately the same as the size of one dot of an element which sublimates a sublimation ink such as a photographic printing element of a thermal head. On the other hand, in FIG. 1, a plurality of (4×4=16 in FIG. 1) photographic printing dots form one pixel, by stepwisely changing the photographic printing dot density, a 17-level gradation is reproduced, for example, because of an integral effect of eyes ($n \times n + 1 = n^2 + 1$, $n=4 \rightarrow 16+1=17$ where n: the number of dots at each side). Numbers 0 to 16 on pixels express a gradient. Various methods have been proposed as a method in which the photographic printing dot density is increased in an order in accordance with a gradation, and the varying densities are arranged in various forms such as a spiral, a mesh and a layer. Those methods also are disclosed to scatter the photographic printing dot density by means of error diffusion so that the photographic printing dot density does not appear unnatural to human eyes. Nevertheless, since those conventional methods utilize merely the integral effect of eyes, a unit of the density of the photographic printing dots which form one pixel of the pseudo gradation must be small to a certain extent to maintain resolution.

Hence, when a multigradation is to be obtained at a high resolution by means of a pseudo gradation produced by the binary printer of FIG. 1, if the size of one pixel is the same as that of the direct density method of FIG. 2 as shown in FIG. 1, the binary printer needs to have a photographic printing element of a high dot density as clearly understood by comparing the size of the photographic printing dot in FIG. 1 and the pixel size in FIG. 2. In the example of FIG. 1, a photographic printing element is required to have a density of four times as high as that of FIG. 2 in terms of a vertical and a horizontal size. That is, with respect to the area size, the photographic printing element needs to be 1/16 of the photographic printing element used in the direct density method. Conversely, when the photographic printing element has the same dot density, the size forming one pixel of FIG. 1 is sixteen times larger (4×4=16), thereby deteriorating the resolution. For instance, although a resolution is sufficiently high when the photographic printing element has a photographic printing dot of 300 DPI (dot/inch) which is desired as a relatively fine printing in the direct density method of FIG. 2, if this photographic printing element is used in the pseudo gradation of FIG. 1, the resolution still remains as about 75 DPI, only ¼ the resolution of FIG. 2.

In other words, in the above-mentioned pseudo gradation method and with the binary printer of FIG. 1, to obtain a pixel density similar to that obtained with a photographic printing element producing a photographic printing dot density of 300 DPI, and with a printer which produces the multigradation of FIG. 2 such as a sublimation printer which uses a sublimation ink sheet and a thermal head, a photographic printing element having a dot of about 1200 DPI is required. This is too uneconomical. Although the foregoing description relates to black and white achromatic printing, this is also true with color printing. For each pixel, color printing uses as many print patterns of FIGS. 1 and 2 as the number of the types of color materials which a color printer uses. For instance, in a printer which uses four types of color materials, i.e., yellow Y, magenta M, cyan C and black K, each color material forms a print pattern for one pixel of FIGS. 1 and 2 to obtain a color image. Further, in this case, a very precise printer mechanism is required which makes it possible to match colors for Y, M, C and K.

The description above describes a relationship between the level of a gradation reproduced by each color material, i.e., the number of colors to be reproduced, a resolution, the size of each pixel, the size of a photographic printing element which forms a pixel, a photographic printing density DPI and etc. That is, in a conventional binary printer which utilizes a pseudo gradation, since gradation reproducibility and resolution are incompatible, to maintain reproducibility and resolution both high, a photographic printing element having an extremely high density, a control circuit and a highly precise printer mechanism therefor are necessary. Since this is very uneconomical and inefficient, one of gradation reproducibility and resolution is sacrificed in general. Hence, when a conventional binary printer prints a natural image which requires multigradation, the printed natural image is poor than a natural image which is printed by a multi-value printer.

As described above, the conventional pseudo gradation method above in particular utilizes only an integral effect of eyes among numerous other human visual characteristics. Noting this, the present invention fully utilizes known human visual characteristic which a conventional printing method and a conventional printing apparatus have failed to utilize well, i.e., a characteristic that human eyes have a high resolution with respect to luminance (brightness) but a poor resolution with respect to a color.

FIG. 4 shows an example of a conventional printing apparatus for performing the pseudo gradation of FIG. 1. A color converter 4 converts input image signals R, G and B into cyan C, magenta M and yellow Y, or photographic signals of three primary colors being essential in color printing. A pseudo gradating unit 21-1 generates pseudo graduation signals from the three-primary-color signals in printing C, M and Y and outputs gradation signals for three colors c, m and y. The gradation signals c, m and y are each supplied to a photographic printing element of a binary printer 25 which serves as printing means.

Printing performed by a color printer and the like uses the subtractive color mixture method, and therefore, cyan C, magenta M and yellow Y are used as the three primary colors. The color converter 4 generates the photographic signals of the three primary colors in printing cyan C, magenta M and yellow Y from the originally supplied input image signals red R, green G and blue B. Conversion performed by the color converter 4 is as follows in general:

C=complement R
M=complement G
Y=complement B

That is, complementary colors of R, G and B are C, M and Y, respectively.

The pseudo gradating means 21-1 processes the photographic signals C, M and Y to generate the gradation signals c, m and y, or binary gradation signals, which are then supplied to the binary printer 25 to print a photographic image.

In this conventional pseudo gradation method, a predetermined block is divided by a predetermined number (e.g., 4×4=16) to change a density distribution of one dot of a photographic printing element in a simple manner including the number and the arrangement of printing dots to be printed. Hence, it is possible to uniformly perform a pseudo gradation independently of the content (a frequency component in particular) of an image. Further, the conventional pseudo gradation method utilizes only the integral effect of eyes and totally disregards the human visual characteristic that human eyes have a high resolution with respect to brightness but a poor resolution with respect to a color. Hence, in a simple pseudo gradation method as that shown in FIG. 1, the image quality is quite dependent on the characteristics of parameters (variables) which define a so-called pseudo gradation such as the configuration of photographic printing dots (4×4=16photographic printing dots in FIG. 1) within one pixel (square shape in FIG. 1), the number of the photographic printing dots per one pixel, discontinuity in an arrangement of the photographic printing dots (discontinuity among the black dots indicated at 2, 4 and other numbers expressing the gradient in FIG. 1).

When a further level of multigradation is to be obtained by the pseudo gradation method of FIG. 1, the number of the photographic printing dots per one pixel, that is, the photographic printing dot density needs be increased. FIG. 3 shows one of the manners of increasing the photographic printing dot density disclosed in "Real Color Hard Copy," by Takeshi Agui, Masayuki Nakajima and Tsuyuki Kada, Sangyo Tosho Shuppan, Oct. 8, 1993, 1st edition, p. 103, Table III.3.5.

As clearly shown in FIG. 3, one photographic printing dot which is to have a deeper gradation is reduced in size. In addition, a pseudo gradation image which corresponds to a bright portion of an image signal is a group of pixels each having a less number of photographic printing dots shown in the left side in FIG. 3 (four photographic printing dots in this example). Since each pixel includes a small number of photographic printing dots, the resolution drops. In short, the gradation level and the resolution are incompatible. When the gradation level is increased, the resolution of the image is deteriorated. Conversely, when the density of adjacent photographic printing dots is increased to prevent deterioration in the resolution, the gradation of the image becomes shallow.

The problems with a conventional binary printer, e.g., an ink jet printer which injects an ink droplet onto a print paper to print letters and images and a thermal fusion printer which uses a binary ink sheet and a thermal head, are summarized as follows.

First, to maintain resolution in the conventional pseudo gradation method (e.g., a method which changes the number of the black dots of a predetermined photographic printing dots per one pixel (FIG. 1) and a density change method which changes a density distribution of photographic printing dots per one pixel (FIG. 3)), a unit of the density of the photographic printing dots which form one pixel must be small to a certain extent. However, when the density of the photographic printing dots forming pixels is increased or the size of one pixel is reduced only to ensure high resolution, since the photographic printing dots have a fixed size, the density distribution of the photographic printing dots within one pixel cannot change largely or conversely the number of the photographic printing dots must be decreased. As a result, the gradation becomes shallow.

Second, if the pseudo gradation method is to generate a multigradation similar to that obtained in the direct density method described above (typically, a method which fixes the area size of each pixel and changes the amount of a fused ink or a supplied ink within each pixel and a method utilizing a sublimation ink and a thermal head) but with the pixel size staying the same as in the direct density method, the area size of a photographic printing dot forming each pixel needed in the pseudo gradation method must be quite smaller (e.g., 1/16) than in the direct density method. Further, when a binary printer is to print a high definition image signal which includes information as much as about five times that of an image signal of the conventional NTSC method at a gradient similar to that of the NTSC method, the area size of the photographic printing dot could become about 1/80 of the area size of the photographic printing dot in the direct density method which is used for the NTSC method image signal.

In addition, even if the gradation level is maintained, the resolution is poor for high definition use. Thus, it is very difficult or almost impossible to print a high definition image signal using a binary printer.

Third, even when the gradient is the same as that of the direct density method which is based on a density change and even when a certain deterioration in the resolution is allowable, as far as the conventional pseudo gradation method as that of FIG. 1 is used, the area size of a photographic printing dot must be smaller than in the direct density method. In addition, a printer mechanism for the pseudo gradation method needs a precision as good as four times that of a printer mechanism which is used in the direct density method (e.g., 1/16) with respect to a vertical magnification and a horizontal magnification. That is, if the printer mechanism fails to achieve this accuracy, the color printing apparatus consequently creates color shift.

Fourth, due to the first to the third real problems, when a natural image (e.g., a smooth portion of a cheek of a human face, green leave) is recorded by a binary printer, since it is unavoidable to design the printer so that either the resolution or the gradation level must be sacrificed in general, a printed image has a poor quality and a pseudo contour is created. That is, in a binary printer of this type which uniformly divides one pixel of a predetermined conventionally defined block by a predetermined number using a photographic printing dot size as a unit, during processing of an image signal in a digital signal region, an influence of a quantization error is combined with an influence of discontinuity in the manner of forming a block, whereby a pseudo contour appears in the cheek of a human face. To radically solve this problem, it has been desired to obtain a pixel size or a photographic printing dot size which is suitable to a high region portion and a low region portion of an image signal while further noting the incompatibility between the resolution and the gradation reproducibility mentioned earlier, the photographic printing dot size and the accuracy of the printer mechanism, and noting not only the integral effect of human eyes but also a number of other human visual characteristics.

SUMMARY OF THE INVENTION

The present invention is directed to solve these problems, and a main object thereof is to provide an apparatus and method for performing photographic printings which secures excellent reproducibility and resolution of gradation (color reproducibility) of printing even on a binary printer such as an ink jet type.

In an apparatus and method according to the present invention a black signal and a chrominance signal are calculated from a photographic signal generate and these signals are separately gradated. The black signal and the chrominance signal may be gradated simultaneously or in a time sharing manner. Since a processing time is reduced when the signals are gradated simultaneously, simultaneous gradating is effective particularly in photographic image processing of a large size image and processing of an HDTV input image signal which contains about five times larger information than an image signal of a current TV system (NTSC system). The structure of the apparatus can be simplified if gradating is performed in a time sharing manner.

Further, frequencies of the black signal and/or the chrominance signal are discriminated. The signal whose frequency is discriminated is gradated with a gradation and a resolution which are determined in accordance with a result of frequency discrimination. A signal whose frequency is not discriminated may be uniformly gradated.

In a photographic printing method and the photographic printing apparatus according to the present invention a luminance signal is calculated from a photographic signal, and a black signal which includes only a black component is calculated from the luminance signal. A color difference signal which consists of a difference component between the photographic signal and the luminance signal is then calculated. A low region color difference signal is then generated by cutting off a high region signal from the color difference signal. A low region color difference signal having the smallest value is identified, and a signal which is equivalent to this smallest low region color difference signal but has a reversed sign is outputted as a color density signal. The low region color difference signal and said color density signal are added to each other to obtain a chrominance signal which includes only a color component. The color density signal is subtracted from the luminance signal to obtain a black signal in which an overall brightness balance of a photographic image is intensified and a high frequency component of a colored portion is enhanced.

In addition, the gradation and the resolution are determined by appropriately combining a plurality of gradation patterns which express the size of a photographic printing dot forming a pixel of the gradation signal or the depth of a density distribution of photographic printing dots having the same gradation level as a predetermined gradation level of the gradation signal.

According to the present invention, the photographic signal is separated into the black component which human eyes can recognize at a high resolution and a color component which human eyes can recognize at a lower resolution. The separated signals are gradated independently of each other. Since the respective components are gradated appropriately, the gradating not only utilizes the integral effect of human eyes but also fits general human visual characteristics. For example, the black component is gradated while respecting the resolution rather than the gradation, whereas the chrominance signal is gradated while respecting the gradation rather than the resolution.

Frequencies of the black signal and/or the chrominance signal are discriminated and the depth of a density distribution of pixels and photographic printing dots forming the pixels is controlled semi-automatically in accordance with whether the frequencies are high or low, whereby a proper gradation level and a proper resolution are obtained.

A black signal processing process and a chrominance signal processing process are performed with the color density signal interposed between the same. That is, subtraction processing (i.e., to subtract the color density signal from the luminance signal) is performed to adjust an overall brightness balance of a photographic image which is outputted at the last printing step. Therefore, a proper black signal is obtained in which a high frequency component of a colored portion is enhanced and which produces a good brightness balance and a well-modulated image.

During the chrominance signal processing process, a photographic brightness component of an intermediate/low region chrominance signal is supplemented since the color density signal which includes intermediate/low region components of the photographic signal is added to two of three low region chrominance signals. During the black signal processing process, the color density signal which includes the intermediate/low region components is subtracted from the luminance signal which includes frequency components of the intermediate/low to a high and a very high regions of the photographic signal, the amount of the photographic brightness components of the intermediate/low regions included in the black signal is reduced. In other words, in terms of a frequency characteristic, the process for the chrominance signals function as a low pass filter which supplements the intermediate/low regions and the process for the black signal functions as a high pass filter.

Gradation signals generated from the chrominance signals have a high gradation level corresponding to the color density signal. Hence, when the photographic brightness components are generated, it is a gradation signal in which the three color materials (cyan, magenta, yellow) rather than the black signal are in charge of the black component which corresponds to the color density signal that is supplied to the printing means which synthesizes an image by utilizing the subtractive color mixture method.

The above and further object and features of the invention will more fully be apparent from the following detailed description with accompanying drawings.

BRIEF DESCRIPTION OF THE DRAWINGS

FIG. 9 is a timing chart showing an example of processing in the embodiment 5;

DESCRIPTION OF THE PREFERRED EMBODIMENTS

In the following, the present invention will be described with reference to the drawings which show the embodiments of the present invention.

Embodiment 1

Figure 1:
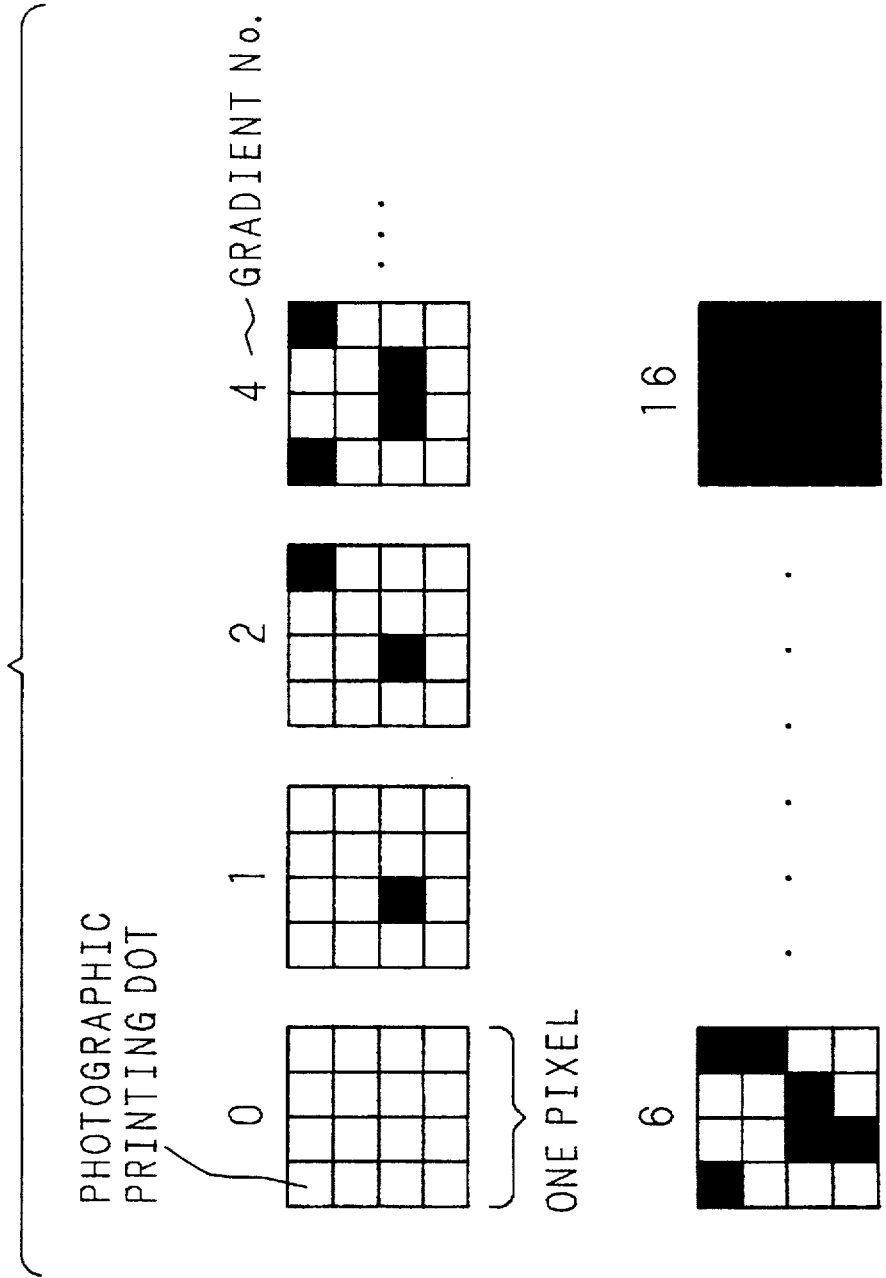
FIG. 1 is an explanatory diagram of a conventional pseudo gradation method.
Figure 2:
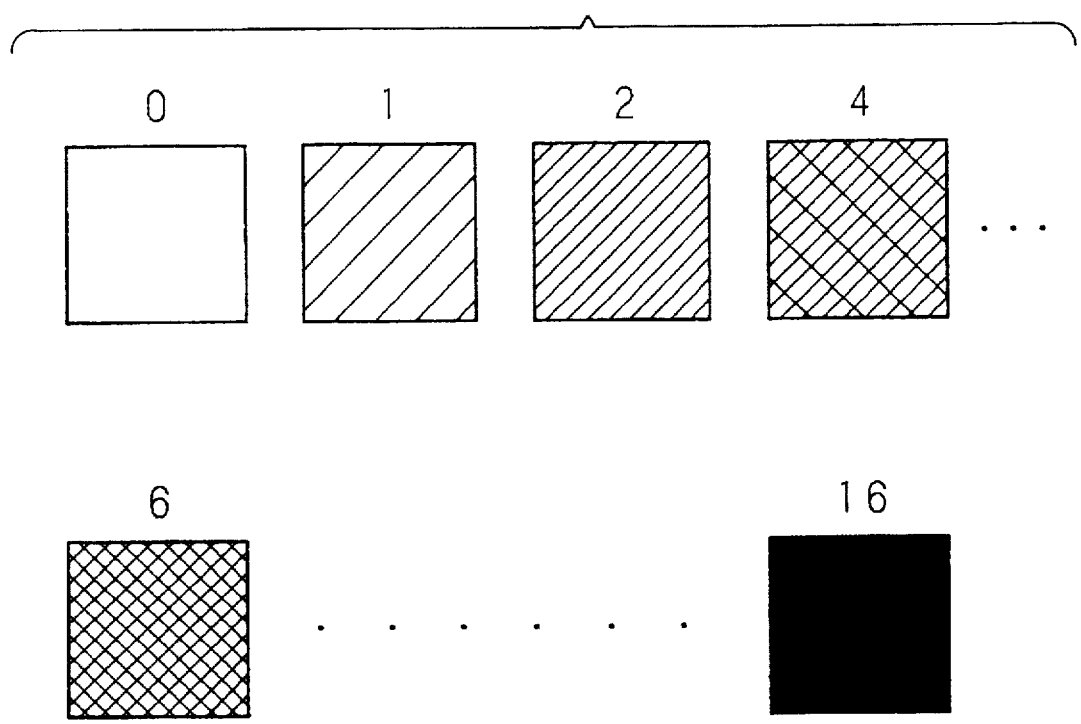
FIG. 2 is an explanatory diagram of a conventional direct density method.
Figure 3:
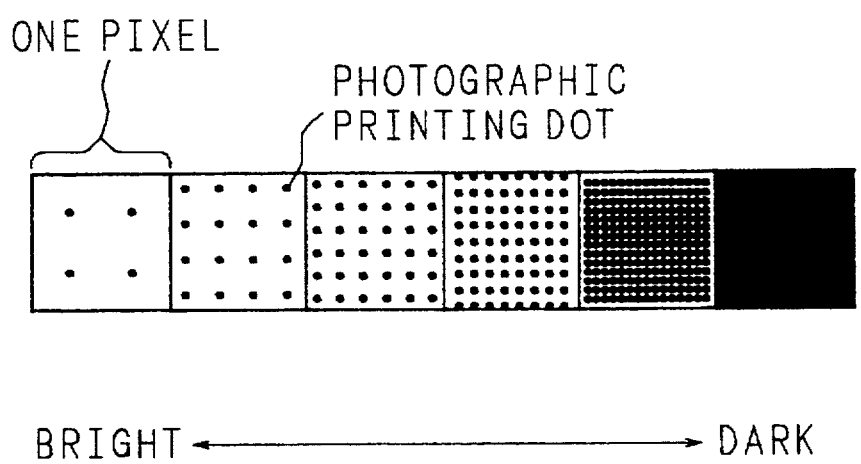
FIG. 3 is an explanatory diagram of a pseudo gradation method for performing a multigradation.
Figure 4:
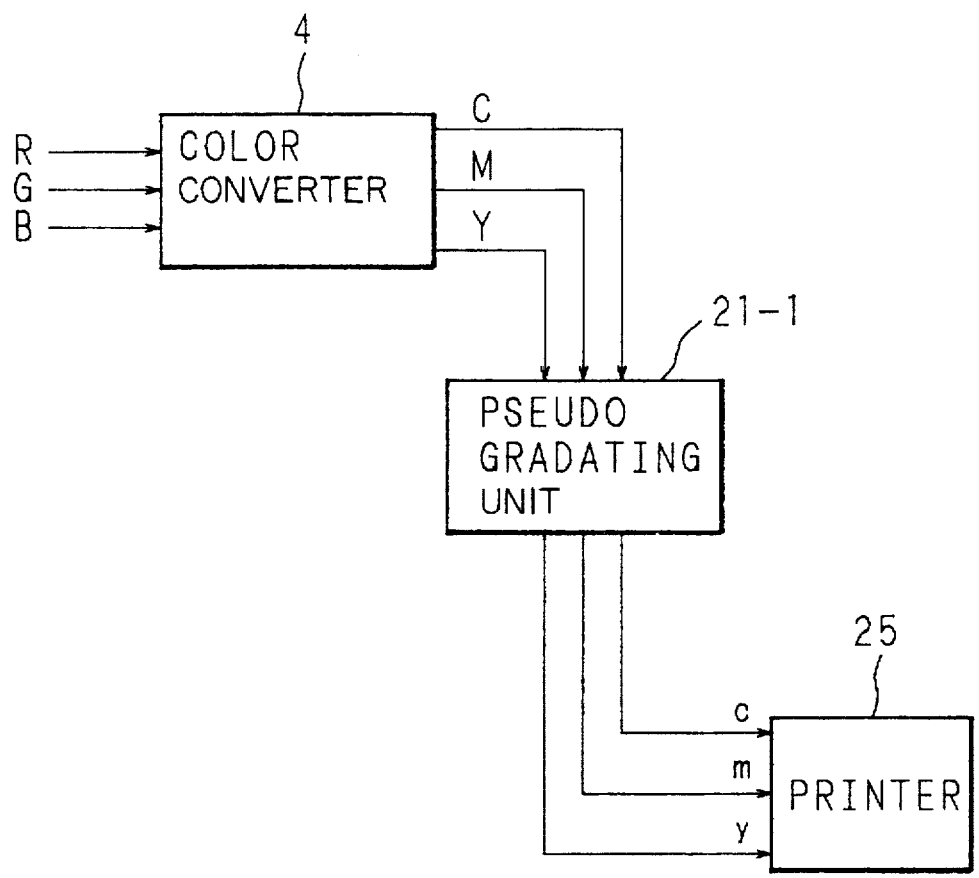
FIG. 4 is a block diagram of a conventional photographic printing apparatus utilizing a pseudo gradation method.
Figure 5:
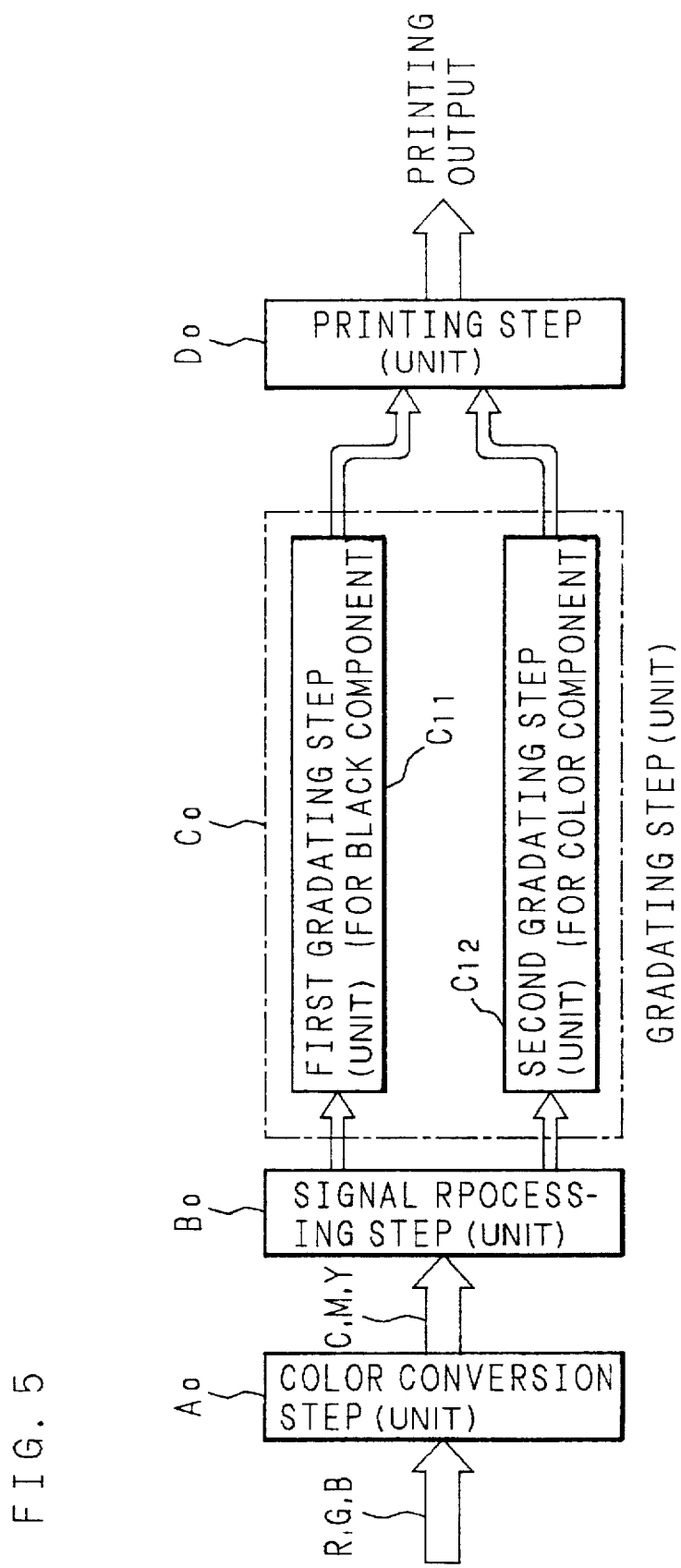
FIG. 5 is a block diagram showing embodiments 1 and 5.

FIG. 5 is a view simultaneously showing a photographic printing method and apparatus according to the first embodiment of the present invention. In the conventional technique as shown in FIG. 4, input image signals R, G, B are color-converted into printing three-primary-color signals (i.e., photographic signals). Specifically, C, M, Y gradation signals c, m, y are generated from the printing three-primary-color signals by a pseudo gradating unit 21-1, and the gradation signal c, m, y is used in printing, that is, corresponding steps are performed in this order. In embodiment 1, however, a signal processing step $B_0$ follows a color conversion step $A_0$. At the signal processing step $B_0$, a black component and color components of the photographic signal C, M, Y are calculated and the components are gradated respectively at a first gradating step $C_{11}$ and a second gradating step $C_{12}$. Gradation signals corresponding to the black component and the color components are generated approximately at the same time at these two gradating steps. The gradation signals are then sent to the next printing step $D_0$.

By adopting this series of steps, it is possible to perform gradating which fits human visual characteristics (a characteristic that human eyes perceive black (luminance) information with high resolution but perceive color information with low resolution), e.g., gradating which respects a resolution with respect to information of the black component (reduce each pixel and have a shallow photographic printing dot density distribution) but respects a gradation with respect to color signals in general (enlarge each pixel and have a deep photographic printing dot density distribution).

In FIG. 5 wherein the black component and the color components are gradated each at one gradating step, a plurality of gradating steps may be prepared in advance for the black component and the color components, and proper gradating steps may be selected in accordance with the type of video software which serves as a source of the input image signals (amusement software such as movies and games, TV programs, designs, graphics and so on).

This makes it possible to obtain gradation signals which are the best match to image signals of various kinds of video software. When ROMs of the LSI, for instance, are used as specific hardware at the first and the second gradating steps, it is possible to change the processing at the gradating step in the photographic printing method merely by switching the ROMs.

Further, since inspection regarding the black component and inspection regarding the color components are performed separately in the total photographic printing method, maintenance and inspection of the photographic printing method as a whole are easy. This is possible because the signal processing step and the gradating step for the black component and those for the color components are separated from each other. In short, it is possible to evaluate maintenance of a mutually related system and independent systems toward the printing step concerning the black component and the color components independently of each other, and to evaluate maintenance of a total system combining the steps of the photographic printing method as a whole. Hence, when there is a problem, it is easy to detect the problem.

Embodiment 2

Embodiment 2 further specifically defines the contents of the signal processing step $B_0$ and the gradating step $C_0$ of embodiment 1. Simultaneously, describing the structure and steps, the signal processing step $B_0$ consists of a black signal generating step $B_1$, a frequency discriminating step $B_2$ and a chrominance signal generating step $B_3$. A third gradating step $C_3$ and a fourth gradating step $C_4$ are performed instead of the first gradating step $C_1$ and the second gradating step $C_{12}$ of embodiment 1. This will be described while referring to FIG. 6. A difference from embodiment 1 is to perform the frequency discriminating step $B_2$ and the third gradating step $C_3$ of a so-called variable gradation type for outputting a gradation signal K which has a controlled gradation and a controlled resolution in response to an output signal obtained as a result of the frequency discriminating step $B_2$. At the black signal generating step $B_1$, a black signal $K_1$ consisting of a black component is generated from the photographic signals C, M and Y. At the chrominance signal generating step $B_3$, chrominance signals $C_1$, $M_1$ and $Y_1$ each including only a color component are generated. At the frequency discriminating step $B_2$ frequencies of the black signal $K_1$ are discriminated to obtain a discrimination signal.

At the third gradating step $C_3$ to which the black signal $K_1$ is supplied, in accordance with an output signal outputted as a result of the frequency discriminating step $B_2$, the gradation signal K is outputted which at least has a controlled variable, i.e. a parameter which defines a gradation and a resolution of a gradation signal which corresponds to the black signal $K_1$, that is, the depth of a density distribution of pixels and photographic printing dots forming the pixels. At the fourth gradating step $C_4$ to which the chrominance signals are supplied, gradation signals c, m, and y are outputted which have said variables fixed each defining gradation and a resolution of an associated gradation signal corresponding to each one of chrominance signals $C_1$, $M_1$ and $Y_1$.

With respect to timing, the gradation signals processed approximately at the same time at the third and the fourth gradating steps $C_3$ and $C_4$ and outputted therefrom are supplied to the next printing step $D_0$ to control a photographic printing element (e.g., ink jet nozzle) during printing of an image. That is, in embodiment 2 when the gradation signal K is generated from the black signal $K_1$, at least said variables each defining a gradation and a resolution are automatically controlled or selected in accordance with a frequency component of a target pixel which is expressed by the black signal $K_1$ of the photographic signals, and a corresponding gradation signal is generated at the third gradating step $C_3$. In the photographic printing method, when parameters are determined in advance from various experiment data to define gradation and resolution in accordance with the value of a frequency component of the black signal $K_1$ so that the output signal outputted as a result of the frequency discriminating step $B_2$ and the third gradating step $C_3$ fit a plurality types of video software, even a person with no skill can semi-automatically set the gradating steps and maintain both the gradation and the resolution more easily than in embodiment 1.

Now, referring to FIGS. 8A to 8D, a description will be given on a manner in which the gradation signal K is generated from the output signal outputted as a result of the third gradating step $C_3$ in accordance with the value of the frequency component of the target pixel expressed by the black signal $K_1$, i.e., intermediate/low, high and very high regions.

Figure 8A:
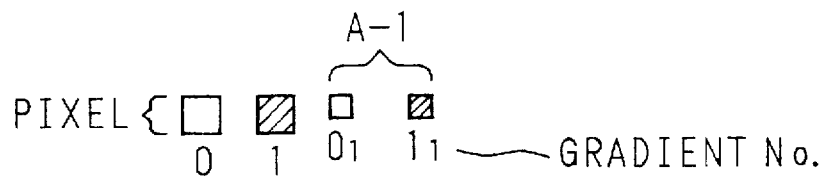
FIG. 8A shows a pixel model which expresses a pseudo gradation in a very high region of a luminance signal.
Figure 8B:
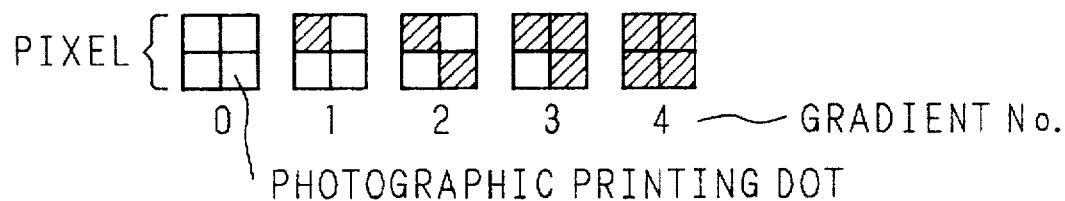
FIG. 8B shows a pixel model which expresses a pseudo gradation in a high region of a luminance signal.
Figure 8C:
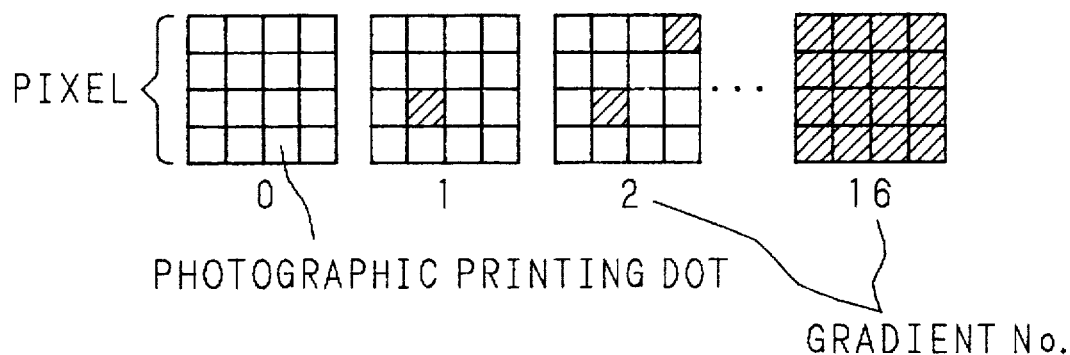
FIG. 8C shows a pixel model which expresses a pseudo gradation in intermediate/low regions of a luminance signal.

FIGS. 8A, 8B and 8C each show one pixel of the gradation signal outputted at the third gradating step $C_3$ when the frequency component of the target pixel expressed by the black signal $K_1$ (the output signal outputted at the black signal generating step $B_1$) which is included in the inputted photographic signal corresponds to the very high, the high and intermediate/low regions, respectively. At the fourth gradating step $C_4$ to which the chrominance signals are supplied, a gradation signal based on a pixel as that shown in FIG. 8C is uniformly generated independently of the frequencies of the chrominance signals.

As clearly shown in FIGS. 8A, 8B and 8C, as the frequency component of the target pixel expressed by the black signal $K_1$ shifts from the very high, the high and the intermediate/low regions, the area size of one pixel increases 1, 4 and 16 times respectively, for example, where 1 is the area size of one pixel of FIG. 8A. As a pixel for the chrominance signals which include only color components which human eyes cannot recognize at such a high resolution as when recognizing the black component (luminance), the pixel of FIG. 8C having the largest area size is used.

Analyzing FIGS. 8A, 8B and 8C in terms of a gradient, a gradation is binary in FIG. 8A, n×n+1=2X 2+1=5 levels in FIG. 8B (the labels 0–4 below the pixel express the gradation in FIG. 8B), and 4×4+1=17 levels in FIG. 8C (the labels 0–16 below the pixels express the gradation in FIG. 8C). (The symbol "n×n" expresses the number of photographic printing dots forming one pixel.) Through a biological optical filter of human eyes, a photographic image printed by this photographic printing method is an information source which semi-automatically sends photographic image information with desirably compatible gradation and resolution. Thus, embodiment 2 offers such a desirable photographic printing method.

Embodiment 3.

Figure 6:
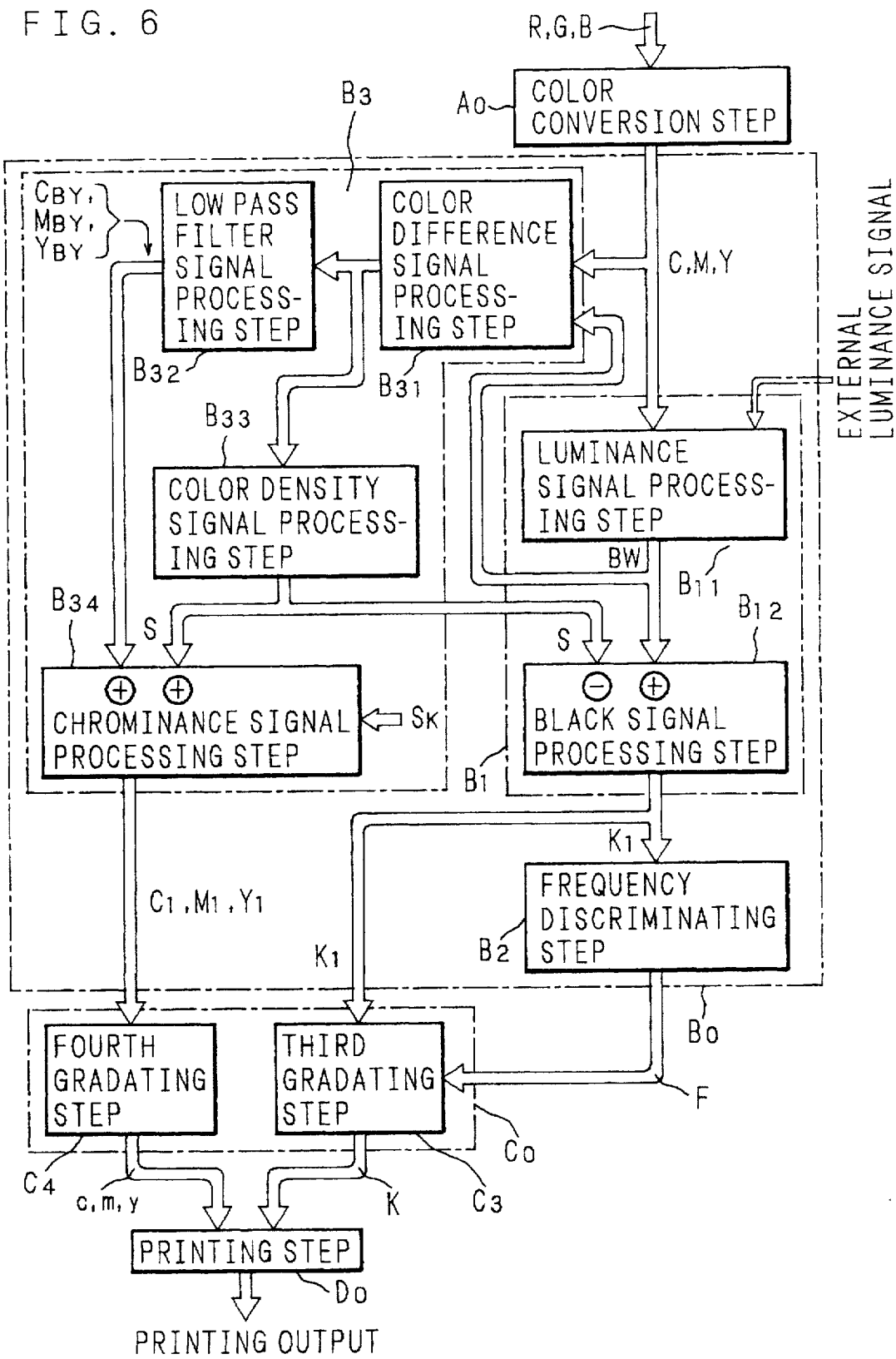
FIG. 6 is a block diagram showing a photographic printing apparatus according to embodiments 2 and 3.

A photographic printing method according to the embodiment 3, or the black signal generating step $B_1$ and the chrominance signal generating step $B_3$ of embodiment 2 defined more specifically, will be described with reference to FIG. 6. An overall structure will be described first. The black signal generating step $B_1$ consists of a luminance signal processing step $B_{11}$ for processing a luminance signal BW from the output signals of the color conversion step $A_0$ and a subsequent black signal processing step $B_{12}$ for processing the black signal $K_1$ which includes the black component from the luminance signal BW. The chrominance signal generating step $B_3$, which is performed parallel to the black signal generating step $B_1$, consists of a color difference signal processing step $B_{31}$ for processing color difference signals (C-BW), (M-BW) and (Y-BW) from the output signals C, M and Y of the color conversion step $A_0$ and the luminance signal BW of the luminance signal processing step $B_{11}$, a low pass filter signal processing step $B_{32}$ for cutting off predetermined high region signals from the output signals of the color difference signal processing step $B_{31}$ and to output low region color difference signals $C_{BY}$, $M_{BY}$ and $Y_{BY}$, a color density signal processing step $B_{33}$ for outputting the smallest one of the low region color difference signals $C_{BY}$, $M_{BY}$ and $Y_{BY}$ but has a reversed sign as a color density signal S, and a chrominance signal processing step $B_{34}$ for adding the low region color difference signals $C_{BY}$, $M_{BY}$ and $Y_{BY}$ to the color density signal S and outputting any one of chrominance signals $(C_{BY}+S, M_{BY}+S)$, $(M_{BY}+S, Y_{BY}+S)$ and $(Y_{BY}+S, C_{BY}+S)$ each including only a color component. At the black signal processing step $B_{12}$, the color density signal S is subtracted from the luminance signal BW (=BW-S) to generate the black signal $K_1$. Hereinafter, $C_{BY}+S=C_1$, $M_{BY}+S=M_1$ and $Y_{BY}+S=Y_1$.

In embodiment 3, as well as in embodiment 2, from the photographic signals C, M and Y, the black signal $K_1$ which includes only the black component (generated at the black signal generating step $B_1$) and the chrominance signals which include only the color components (generated at the chrominance signal generating step $B_3$ as combination of the signals $C_1+M_1$, $M_1+Y_1$, or $Y_1+C_1$) are generated parallel to each other. However, since the gradation signal K obtained from the black signal $K_1$ and the gradation signals c, m and y obtained from the chrominance signals are integrated at the printing step, a concept of the color difference signal is necessary. It is also necessary to determine a distribution of the black signal level between the two generating steps, matching of the black signal level of the photographic image and the black signal levels of the input image signals R, G and B, conversion of the input image signals R, G and B as three dimensional signals into two dimensional signals due to separation of the black signal and the color signals, and a specific approach to human visual characteristics (e.g., where to use HPF or LPF, how to maintain colorfulness on a black image by the black signal $K_1$).

From the input image signals red (R), green (G) and blue (B), the photographic signals cyan (C), magenta (M) and yellow (Y), which are needed for printing utilizing the subtractive color mixture method, are obtained by means of color conversion. A correcting step for correcting the printing images and the like which usually follow are omitted here.

Due to the necessity of the concept of the color difference signal, the luminance signal BW is processed from the photographic signals C, M and Y, and the luminance signal BW at the luminance signal processing step $B_{11}$ is supplied together with the photographic signals C, M and Y to the color difference signal processing step $B_{31}$ to output the signals (C-BW), (M-BW) and (Y-BW) initially needed for the concept of the color difference signal. The photographic signals C, M and Y are complementary colors of red (R), green (G) and blue (B), respectively, and each have an opposite phase (180 degrees). Further, since the photographic signals C, M and Y express color differences from the luminance signal BW, the photographic signals C, M and Y have negative signs as well unlike the input image signals R, G and B.

Figure 7A:
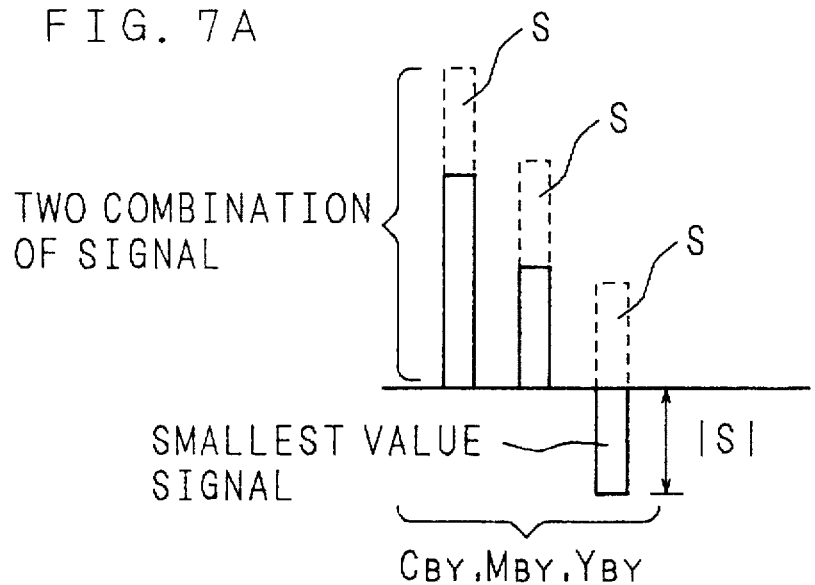
FIG. 7A is an explanatory diagram showing a smallest value signal of low region color difference signals which have a positive and a negative signs.
Figure 7B:
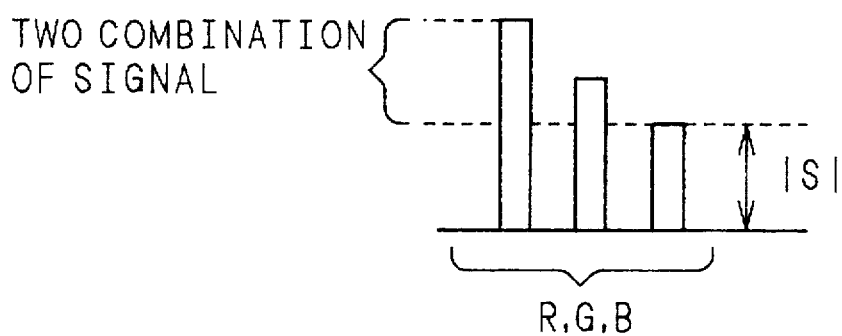
FIG. 7B is an explanatory diagram showing a smallest value signal of an input image signal.

It is known that human eyes have a visual characteristic that a resolution to color information is lower than a resolution to black information (i.e., luminance information). However, this is not true with a gradation level. Hence, for a gradation of a target pixel of a color component, a large pixel as that shown in FIG. 8C, for instance, is used. (This agrees with an example of a specific approach to human visual characteristics mentioned earlier.) That is, the depth of the gradation is respected rather than chromatic information having a higher resolution than the pixel of FIG. 8C. From this point of view, determining that a color difference signal component of the high or the very high region is not necessary, and the color difference signals (C-BW), (M-BW) and (Y-BW) are supplied to the low pass filter signal processing step $B_{32}$. The low pass filter signal processing step $B_{32}$ is a low pass filter (LPF), in other words. At the low pass filter signal processing step $B_{32}$, a high frequency component is cut from the color difference signals and low region color difference signals $C_{BY}$, $M_{BY}$ and $Y_{BY}$ are obtained. That is, $$C_{BY}=L[(C-BW)]$$

$$M_{BY}=L[(M-BW)]$$

$$Y_{BY}=L[(Y-BW)] \qquad (1)$$

where L[ ] means to pass a signal through the low pass filter signal processing step. Next, at the color density signal processing step $B_{33}$, the smallest value $M_{in}$ [$C_{BY}$, $M_{BY}$ and $Y_{BY}$] of the low region color difference signals $C_{BY}$, $M_{BY}$ and $Y_{BY}$ is determined considering the signs of the low region color difference signals as well, and the sign of the smallest value signal is reversed to obtain the color density signal S. Use of the smallest value signal is known in conventional color conversion as well. For example, as the smallest value signal S of the input image signals R, G and B, a level common to the signals R, G and B is determined as the black component and the remaining two dimensional signals R-G, G-B and B-R are processed as shown in FIG. 7B. In the present embodiment, the smallest value signal considering the sign as well is determined from the signals $C_{BY}$, $M_{BY}$ and $Y_{BY}$ which have the positive and the negative signs as shown in FIG. 7A.

In other words, while the signals $C_{BY}$, $M_{BY}$ and $Y_{BY}$ can have positive and the negative signs, it is impossible to generate a physically meaningful photographic signal when the signals $C_{BY}$, $M_{BY}$ and $Y_{BY}$ have negative signs. At the chrominance signal processing step $B_{34}$, therefore, the color density signal S defined as above is added to the signals $C_{BY}$, $M_{BY}$ and $Y_{BY}$ to generate new chrominance signals $C_1$, $M_1$ and $Y_1$ which always have the positive signs. That is, $$C_1=C_{BY}+S$$

$$M_1=M_{BY}+S$$

$$Y_1=Y_{BY}+S \qquad (2)$$

As shown in FIG. 7A, when one of the chrominance signals $C_1$, $M_1$ and $Y_1$ is a color difference signal which has the negative sign, this chrominance signal is determined as the smallest value signal and the sign of this smallest value signal is reversed to obtain the color density signal S.

In the operation of the equations (2), the color density signal S is added to two of the color difference signals, and the color difference signals having the smallest level have the same amplitude but opposite signs. Hence, the other one color difference signal is zero. That is, using the parameter S, the color phase is expressed as combination of two of the color difference signals.

Since the brightness of the intermediate/low regions of a photographic image is realized by a black photographic image which is obtained from the color density signal S utilizing the subtractive color mixture method, a gradation level of the black signal generated by the black signal system, and consequently, a background black image is light. Hence, there is little interference (deterioration of colorfulness and blotting) of a color which is close to the printing surface onto the color materials due to the black image and each pixel is large. Therefore, it is possible to obtain a photographic image corresponding to intermediate/low frequencies in which the gradation is deep and the color materials are vivid.

Describing the equations (2) in more detail, one of the combinations $C_1$-$M_1$, $M_1$-$Y_1$ and $Y_1$-$C_1$ of the chrominance signals $C_1$, $M_1$ and $Y_1$ which are generated from the low region color difference signals $C_{BY}$, $M_{BY}$ and $Y_{BY}$ appears as if the color density signal S is added as described before and shown in FIG. 7A. The presence of the color density signal S newly adds the black component, which is obtained as a result of subtractive mixture of colors and which corresponds to the same amounts of cyan, magenta and yellow combined together, to the background black image. In short, this is a characteristic which enhances intermediate/low components.

That is, the black component which creates darkness is increased. This changes the balance with the brightness levels of the input image signals R, G and B. The brightness level of the black image created by the black signal is lightened anticipating this by performing the black signal processing step $B_{12}$.

Now, a description will be given on subtraction of the luminance signal BW from the color density signal S performed at the black signal processing step $B_{12}$. At the black signal processing step $B_{12}$, operation $$K_1 = BW - S \qquad (3)$$

is performed. That is, a portion of a target pixel of the luminance signal, in particular, the black component of that portion of an intermediate/low pixel, i.e., a photographic brightness component is reduced by the amount of the color density signal S.

By performing this, the black signal $K_1$ is set less by the amount which corresponds to the brightness of the color density signal S in advance so that the black image is lightened. The black signal $K_1$ is combined with the increased photographic brightness component corresponding to the color density signal S.

Performing the operations defined by the equations (2) and (3), the total brightness balance between the black signal generating step $B_1$ and the chrominance signal generating step $B_3$ is adjusted. It is, of course, possible to fine adjust a brightness balance between the photographic image and the input image signal using a signal $S_K$ which affects the color density signal S as a bias signal (FIG. 6, the chrominance signal processing step $B_{34}$).

In addition, the low pass filter signal processing step (LPF) $B_{32}$ in principal reduces the possibility that the color materials of cyan, magenta and yellow overlap at a minute area where the frequency of a target pixel of the chrominance signals including the color components alone is high. Further, in the minute area, the color density signal S is closer to zero due to the low pass filter signal processing step $B_{32}$. As a result, there is a little deterioration in the luminance at bright/dark portions in the minute area of the photographic image due to the color components, and the bright/dark portions in the minute area are printed almost only by the luminance signal BW which is generated at the luminance signal processing step $B_{11}$. In other words, the black signal $K_1$ which is obtained by subtracting the color density signal S (the black component of the colored portion) from the luminance signal BW is a high region enhanced signal in which an edge around the colored portion is enhanced.

Analyzing the equation (3) as well as the equations (2), since the color density signal S is processed by the high region signal processing, the color density signal S mainly consists of intermediate/low region signal components. Since the color density signal S of such nature is subtracted at the black signal processing step from the luminance signal BW which is generated at the luminance signal processing step $B_{11}$, at least the black signal $K_1$, or the output signal obtained by the black signal processing step $B_{12}$, is a signal of a high region passed type in which a high region component is enhanced more than intermediate/low region signal components. That is, the black signal $K_1$ is a signal of a high pass filter (HPF) passed type.

Rather than separating the photographic signals C, M and Y into the black signal and the chrominance signals in a conventional Y/C separation process, the black signal and the chrominance signals are processed using HPF and LPF in terms of frequency considering the brightness level of each signal. That is, together with the intermediate/low region component enhancing characteristic of the equations (2) and the high region component enhancing characteristic of the equation (3), the black balance of the photographic image as a whole is plus/minus zero after addition and subtraction. Thus, the photographic image printed by this photographic printing method, when passed through a biological optical filter of human eyes, serves an information source which sends photographic image information with desirably compatible gradation and resolution to human eyes. This is because the chrominance signal generating step $B_3$ is a process which supplements intermediate/low region components while the black signal generating step $B_1$ is a process of the high region passed type with respect to frequency characteristics, and because both of the characteristics combined with each other at the printing step are passed through the optical filter of human eyes (i.e., visual characteristics) which function like a stagger synchronization circuit which is formed by combining a plurality of synchronization circuits and has a constant characteristic throughout a predetermined region. Thus, a photographic image which fits human visual characteristics is obtained.

Since the frequency discriminating step $B_2$, a new structural feature of the present invention, is the same as that of embodiment 2, and therefore, will not be described here. The third and the fourth gradating steps $C_3$ and $C_4$ will not be described here for the same reason.

Depending on the software which supplies the input image signal, it is determined whether to adopt a first printing order in which the background is printed on the basis of the gradation signal K which is obtained at the third gradating step $C_3$ and the gradation signals c, m and y which are obtained from the chrominance signals at the fourth gradating step $C_4$ are then printed on the background, or to adopt a second printing order which is opposite to the first printing order, or to adopt a third printing order which is combination of the first and the second printing orders. Further, by appropriately switching the first through the third printing orders, it is possible to further average out interference between the black image of the black and the colored images of the chrominance signals (drop in the colorfulness, drop in the black image) and prevent inclination toward the black image of the colored images.

Embodiment 4

Now, embodiment 4 will be described with reference to FIGS. 8A to 8D. The photographic printing method according to the embodiment 4 is exactly the same as above in that said variable defining a gradation and a resolution are changed in accordance with a frequency component of the luminance signal of the signals expressing a target pixel.

However, in the embodiments 2 and 3, pixels and photographic printing dots become uniform when target pixels are pixels belonging to the very high region, for instance. That is, the gradation is 0 or 1. If this is left allowed, the cubic effect with an original subtle resolution is reduced in a printed image of minute surfaces of mountains in nature, surfaces of the moon or a volcano and etc.

If pixels of the very high region are successive to each other, in this embodiment, a variably-controlled gradating step is performed which uses a further smaller pixel as a first additional variable such as pixels $0_1$ and $1_1$ shown in the right-hand side in FIG. 8A. The size of these pixels is preferably linearly changed. To said variable, the first additional variable is added which sets a rate of change of the pixel size from the high to the very high regions relatively large while a rate of change of the pixel size from the low to the intermediate regions is set small, for example.

Figure 8D:
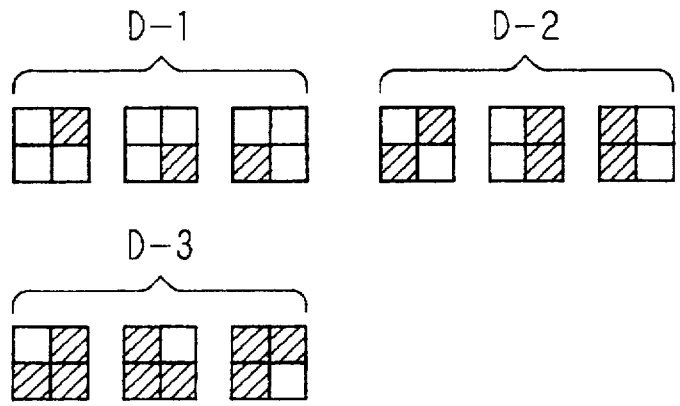
FIG. 8D shows a pixel model which expresses combination of photographic printing dot patterns.

As a second additional variable which is preferred to reduce a pseudo contour which is likely to appear in a shadow portion of a smooth human cheek, a gradation pattern which expresses the specific gradation of FIG. 8B is used, e.g., a plurality of identical gradation patterns D-1 of FIG. 8D are scatteringly used to the gradation No. 1, so that the pseudo contour becomes less noticeable.

The patterns D-2 and D-3 of FIG. 8D are examples showing other patterns with the same photographic printing dot density (i.e., the same gradation) as those of the gradation No. 2 and No. 3 of FIG. 8B.

In an image portion of the very high region as that of FIG. 8A, when the four patterns 0, 1, $0_1$ and $1_1$ of FIG. 8A are used on purpose and a code is determined that the data expressed by a certain arrangement of these patterns corresponds to a photographic image printed by the photographic printing method or apparatus, it is possible to store various code information in the form which is difficult to identify in an image. Of course, it is possible to store code information using the patterns D-1, D-2 and D-3 of FIG. 8D.

Embodiment 5

Embodiment 5 is directed to a photographic printing apparatus corresponding to the method of embodiment 1. Since an operation of the embodiment 5 is basically the same as that of embodiment 1 only with the steps replaced with structural processing units, the operation of embodiment 5 will not be described. In the apparatus of this embodiment, the order of operating the respective units which replace the steps of FIG. 5 may be changed if necessary. Hence, in embodiment 5, a memory process may be used which temporarily stores a time sharing processing concept and the respective process data so that the respective signal processing processes are performed substantially independently of each other. Therefore, it is easy to perform maintenance of a mutually related system and independent systems concerning the black component and the color components. Thus, as in embodiment 1, the advantage of separating the first and the second gradating units is ensured in this embodiment as well.

That is, due to recent technical development in the field of digital signal processing and the field of LSI, mere replacement of the respective steps of the embodiment 1 with structural units does not reduce the cost for wiring and the number of parts needed.

To deal with this, in the signal processing, the black signal processing step, the first gradating step, the color signal processing step, the second gradating step and the memory processing step are performed in this order in a time sharing manner as shown in FIG. 9. In FIG. 9, the processing step of processing the black signal $K_1$ from the three-primary color signals C, M and Y obtained by the color conversion means by color conversion and the first gradating step are performed, and the color signal processing step and the second gradating step are thereafter performed, and results of the respective processing steps are stored in the memory. A signal read from the memory is supplied to the printing units and printed out by the printing units.

This time sharing processing is series processing with respect to time. However, if signal processing processes are of the same type (e.g., the first and the second gradating steps), it is easy to let one of the processes serve as the other as well, the photographic printing apparatus uses less number of wires and bird elements.

The order of the time sharing processing may be changed from that shown in FIG. 9, and may be any suitable combination of the signal processing units, the gradating units and the memory processing including the black signal processing step, the color signal processing step, the first gradating step, the second gradating step and the memory processing step. Even though performed in a time sharing manner, since performed through the memory processing, the black signal processing step for processing the black signal $K_1$, the color signal processing step, the first gradating step and the second gradating step progress independently of each other. The memory is located immediately before the printing processing time slot since the processes of the respective time slots before the memory processing and the respective processes for processing the data are performed concurrently and the results of the processes are supplied to the printing units. The memory processing may be dispersed between the other processing processes.

Embodiment 6

Not all users regard the luminance signal alone as important. Depending on the input image signal originating from a medium and the intended use, the luminance signal is respected and processed by the variable gradating units to maintain both the gradation and the resolution in some cases. For some other users such as a fashion designer and a textile designer, in some cases, the color signals as well must have a subtle tint and a resolution in a minute area.

Hence, when a fine pattern contour including a shade of a design is to be discussed with respect to the same input image signal, the variable defining the gradation and the resolution of the gradation signal of a target pixel expressed by the luminance signal is changed in accordance with a high region frequency component of the target pixel expressed by the luminance signal, so that the processing is adjusted to respect the resolution of the luminance signal. When a tint at a minute area is to be discussed, the variable is changed in accordance with the value of a frequency component of the target pixel expressed by the color signals in a similar manner, so that the processing is adjusted to respect the resolution of the color signals. The embodiment 6 is directed to an photographic printing apparatus which deals with where such importance is put on the resolution of either or both of the signals, whereas the other embodiments deal with where the resolution of only the luminance signal is respected. The luminance signal may be regarded as the black signal.

Figure 10:
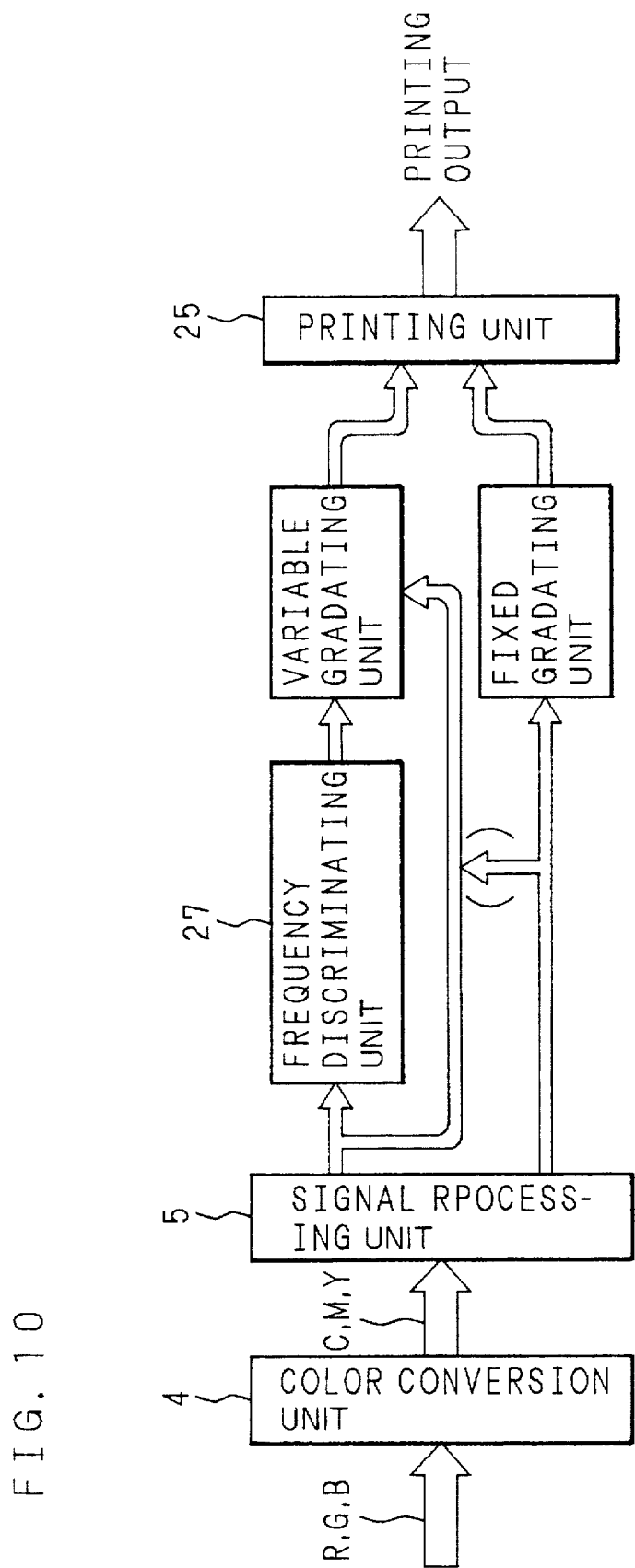
FIG. 10 is a block diagram of a photographic printing apparatus according to an embodiment 6.

FIG. 10 is a block diagram showing the structure of the embodiment 6. A redundant description will be omitted here. Signal processing units 5 also performs a switching function of selectively allowing the black signal and the color signals to frequency discriminating units 27. This will be described with reference to FIG. 9 which shows the time sharing signal processing described in relation to embodiment 5. The frequency discriminating unit 27 frequency discriminating by performing the frequency discriminating step on the black signal at a shadowed time slot x after the time slot of the black signal processing step in FIG. 9 or by performing the frequency discriminating step on the color signals at a shadowed time slot y after the time slot of the color signal processing step in FIG. 9.

Figure 11:
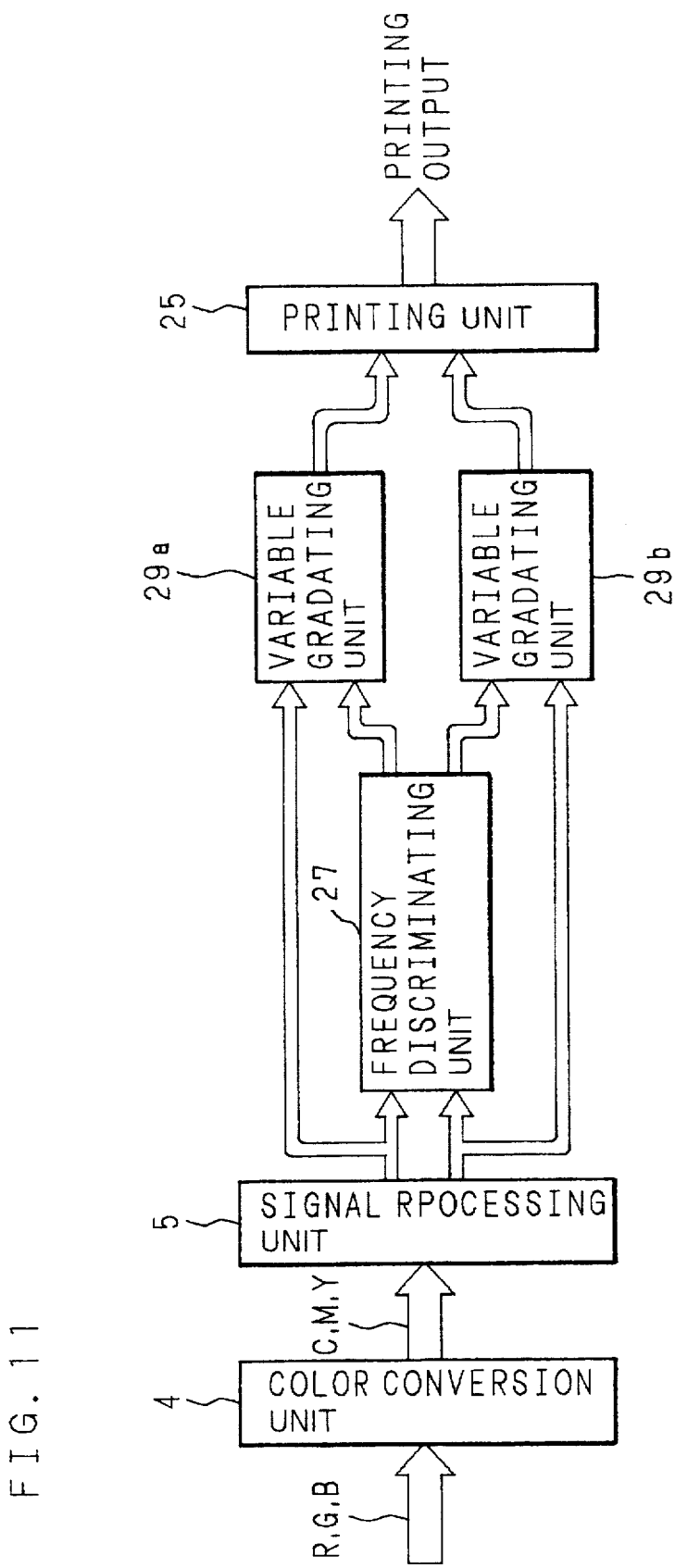
FIG. 11 is a block diagram of other example of the photographic printing apparatus according to the embodiment 6.

Variable gradating of both the black signal and the color signals is realized by supplying both the black signal and the color signals to the frequency discriminating units 27 as shown in FIG. 11 and by processing the black signal and the color signals by frequency discrimination at the time slots x and y during the time sharing signal processing of FIG. 9. Following this, the black signal and the color signals are gradated by variable gradating units 29a and 29b.

Embodiment 7

With respect to the gradating unit for processing the luminance signal, a photographic printing apparatus of this embodiment serves as a base of other embodiments which will be described later.

Figure 12:
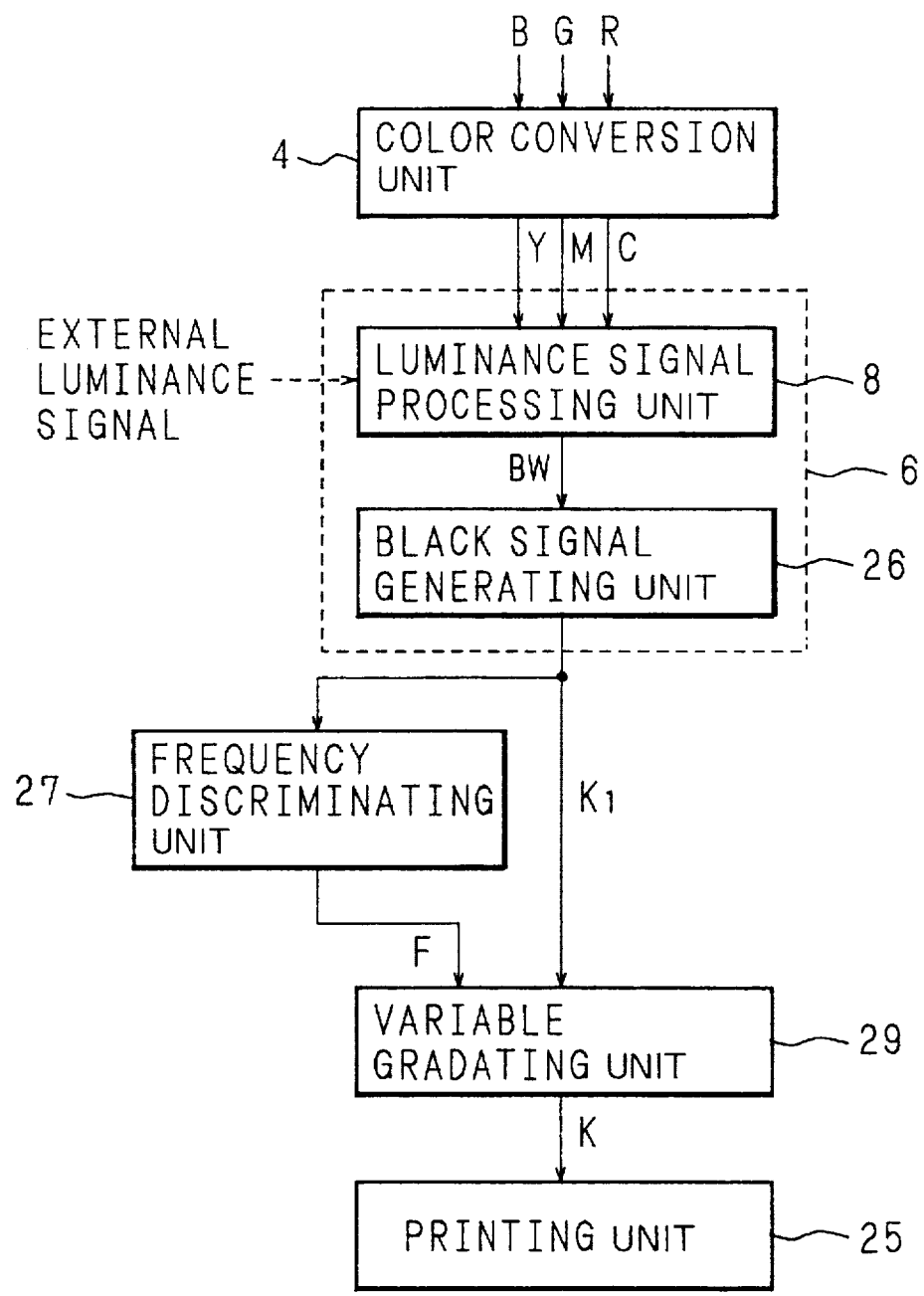
FIG. 12 is a block diagram of a photographic printing apparatus according to an embodiment 7.

Returning to FIG. 12, the photographic printing apparatus comprises the color conversion unit 4 for color-converting input image signals R, G and B into photographic signals C, M and Y, luminance signal processing unit 8 for processing the photographic signals C, M and Y and outputting the luminance signal BW, black signal generating unit 26 for generating the black signal $K_1$ including the black component from the luminance signal BW, the frequency discriminating unit 27 for discriminating a frequency of the black signal $K_1$, third variable gradating unit 29 only for the black signal $K_1$ for changing the variable defining the gradation and the resolution of the gradation signal which corresponds to the black signal $K_1$, i.e., the depth of a density distribution of pixels and photographic printing dots forming the pixels in accordance with an output signal from the frequency discriminating unit 27, i.e., the value of a frequency component of a target pixel expressed by the black signal, and printing unit 25 for printing on the basis of the gradation signal K outputted from the third variable gradating unit 29. The apparatus comprises the black signal generating unit 26 and the frequency discriminating unit 27 in addition to the conventional photographic printing apparatus (the structure of FIG. 4), and replaces the gradating unit 21-1 with the third variable gradating unit 29.

According to this embodiment, since an image is printed in accordance with the gradation signal K of the black signal $K_1$, a photographic image consists of only a black color material.

Hence, as compared with a photographic image printed using color materials as well, the brightness level of the photographic image is more likely to match the brightness level, that is, the luminance level of the input image signal. The apparatus of this embodiment is most suitable to image printing where the input image signal has a subtle tint (e.g., X-raying) (because there is no imbalance in the brightness of the photographic image due to a brightness level created by subtractive mixture of cyan, magenta and yellow). Further, since the present invention uses the frequency discriminating means which is not used in a conventional monochrome printer, the depth of a density distribution of pixels and photographic printing dots forming pixels is semi-automatically adjusted in accordance with a frequency component of a target pixel. Therefore, even with a binary printer, it is possible to obtain a monochrome photographic image which has compatible resolution and gradation.

Even when the input image signal is a signal consisting of R, G and B because of at least the luminance signal included of the input image signal, a fine monochrome (black and white) image with a good gradation and a good resolution which is printed by the apparatus having the structure as above has a better quality than that printed by a conventional black and white printer.

Of course, when an external luminance signal is used, the external luminance signal may be supplied to black signal generating means 6.

Embodiment 8

Now, the embodiment 8 will be described with reference to FIG. 13. A photographic printing apparatus according to the embodiment 8 further comprises the following two units in addition to the structure of embodiment 7. One is signal processing unit 5 which is constructed by combining the black signal generating unit 6 of embodiment 7 with chrominance signal generating unit 7 for generating the chrominance signals $C_1$, $M_1$ and $Y_1$ from the photographic signals C, M and Y. The other is fourth gradating unit 21 for generating a gradation signal only for a chrominance signal which is supplied from the chrominance signal generating unit 7. The fourth gradating unit 21 changes the variable which preliminarily defines the gradation and the resolution for a target pixel which is expressed by the chrominance signals $C_1$, $M_1$ and $Y_1$ (i.e., the pixel size and the depth of a density distribution of the photographic printing dots forming the pixels) uniformly to predetermined values.

The embodiment 8 serves as a basic embodiment defining a relationship between the gradating unit, which generates a gradation signal which corresponds to the black signal $K_1$ generated from the luminance signal BW, and the gradating unit corresponding to the chrominance signals $C_1$, $M_1$ and $Y_1$, throughout from the embodiment 9 which is related to a color printer photographic printing apparatus of embodiment 13.

In other words, a luminance signal process with the input image signals R, G and B, i.e., the black signal generating system, is performed in a similar manner through the same route as in embodiment 7. A feature is that for the color signal process with the input image signals R, G and B, this embodiment uses the chrominance signal generating unit 7 which generates the chrominance signals $C_1$, $M_1$ and $Y_1$ from the photographic signals C, M and Y which are outputted from the color conversion unit 4, and the fourth gradating unit 21 which generates the gradation signals c, m and y only for the color signals from the signals which are outputted from the chrominance signal generating unit 7. Further, a variable, or a parameter defining the gradation and the resolution of the fourth gradating unit 21 is equal to the two parameters of one being the size of a pixel which produces a gradation and a resolution which approximately correspond to intermediate/low region signals of the luminance signal and the other being the depth of the density distribution of the photographic printing dots forming the pixels. Now, a supplemental description will be given on the pixels being approximately the same.

For example, if the variable defining the gradation and the resolution of the gradation signal obtained from the fourth gradating unit 21 for the chrominance signals $C_1$, $M_1$ and $Y_1$ is the same as the variable defining the gradation and the resolution of the gradation signal obtained from the third gradating unit 29 for the black signal $K_1$ of the luminance signal BW, when the time sharing processing (FIG. 9) is to be performed, the same digital signal processing software or the same hardware circuit for digital signal processing may be used in actual processing in the photographic printing apparatus. This is extremely convenient.

In some cases, it is desirable if the variables related to the fourth gradating unit 21 for the chrominance signals are a little smaller than the pixel size or the photographic printing dot size realized by the third gradating unit 29 for a luminance signal of the intermediate/low regions. When an ink jet is used as the printing unit, depending on a condition of the background printed on a print paper (i.e., whether the print paper remains white or has a black image already printed on the same), blotting of a color material on the photographic image surface becomes different. Anticipating blotting, when the center of the photographic printing dot of a color material to be used on the background is maintained but the photographic printing dot of the fourth gradating unit 21 is reduced a little, the size after blotting becomes approximately the same as the size of each pixel and the photographic printing dot size of the background. Hence, it is possible to prevent mixing due to blotting of color materials (cyan, magenta, yellow) namely, unnecessary deterioration in colorfulness due to the black component created by subtractive mixture of colors.

In embodiment 8 fortunately, since the third gradating unit 29, one of the gradating units, is a variable gradating unit while the fourth gradating unit 21, the other one of the gradating units is fixed gradating unit, the gradating signals can be finely adjusted. That is, it is possible to adjust the gradating signals relative to each other which correspond to the pixels and the photographic printing dots forming the pixels. This creates a desirable effect as described in more detail as follows citing an example. For example, when a color material is printed using the printing unit of the ink jet type has a high resolution (Recent ink jet printers have a resolution of 300 DPI or 400,600. Some recent ink jet printers for business use have a resolution of as high as 720 DPI.) on a print paper or over a background of a black image created by the black signal $K_1$, blotting of the color material accounts for an increased area within the image. (As the photographic printing dot becomes smaller, even the same amount of blotting has more influence at each dot.) Taking this phenomena into consideration, by fine adjusting signals which correspond to the pixels and the photographic printing dots forming the pixels of the fourth gradating unit 21 while adjusting the size of the photographic printing dot of the photographic printing head, it is possible to control intermediate/low region pixel signals so that the size of the photographic printing dot after blotting becomes similar to the pixels and the photographic printing dots created by the third gradating unit 29. (Whether the signals belong to the intermediate/low regions is detected from the output signal from the frequency discriminating unit 27.) As described earlier, this prevents deterioration in colorfulness at a colored area due to blotting.

Embodiment 9

The embodiment 9 limits the printing unit 25 for printing while controlling the photographic printing element in response to the output signals from the third and the fourth gradating units 21 and 29 clearly as binary printing unit (i.e., printing unit which operates in accordance with a binary ON/OFF signal).

Since binary printing units require a relatively short energizing time and a relatively short drive time, a time necessary for forming a photographic image is relatively constant, which makes image printing easy.

It is natural to limit the printing unit to binary printing units because the present invention aims at forming a photographic image with an excellent color reproducibility and an excellent resolution even when binary color materials (e.g., ink jet color materials), binary transfer units or other binary photographic printing units are used.

It is to be noted however that the present invention may be performed from an opposite point of view, that is, multi-value printing units (e.g., sublimation printing units) may be used instead of binary printing units.

For example, when an energizing time of a thermal head corresponding to one photographic printing dot of multi-value printing unit such as a sublimation printer is fixed to a predetermined constant time $t_1$, a thermal fusion area size of photographic printing dots which form a pixel becomes approximately constant, thereby replacing binary printing units. In other words, it is possible to form a photographic image even with multi-value printing unit such as a sublimation printer.

Further, by changing the energizing time $t_1$ of the thermal head in accordance with the signal from the frequency discriminating unit 27, i.e., the value of a frequency component of the black signal $K_1$, it is possible to decrease the first additional variable regarding the very high region signal shown as $0_1$, $1_1$ in the right-hand side in FIG. 8A, i.e., the photographic printing dot size in the very high region in the photographic printing method according to the embodiment 4 in an easy manner. (This is possible by reducing the energizing time $t_1$ to a still shorter time $t_2$.)

That is, the present invention may be applied to multi-value printing units. In some cases, use of multi-value printing unit makes it easier to achieve the intended objects (e.g., change of the photographic printing dot size in the very high region) than use of a binary printing unit.

Of course, it is apparent that use of binary printing unit realizes image printing with as good reproducibility as that obtained by multi-value printing unit as far as the binary printing unit has a supplement function of gradually increasing a photographic printing area of each photographic printing dot in accordance with the length of a drive time of driving a photographic printing element.

Embodiment 10

Now, embodiment 10 will be described with reference to FIG. 13. Embodiment 10 similar to embodiment 5 as it is modified to use the photographic printing apparatus of embodiment 9 as a full color photographic printing apparatus. Points of the present embodiment (some redundant with the features of the precedent embodiments) will be described first.

Some features redundant with the features of the photographic printing method of embodiment 3 will be omitted. The points of the present embodiment are as follows.

First, between the color conversion unit 4 and the gradating units (21,29) is the signal processing unit 5 which separates the processing into a black component signal processing route for generating the black signal $K_1$, which consists of the black component from the complementary color processing (color conversion) signals of the input image signals R, G and B, that is, from the photographic signals cyan, magenta and yellow (C, M, Y), and a color component signal processing route for generating the chrominance signals, which consist of only color components (signals combining any two of $C_1$, $M_1$, and $Y_1$ ) (Compare with the conventional technique of FIG. 4.)

Second, the color component signal processing route includes a high region signal cutting off unit 11 for cutting off a predetermined high region signal component from a color component (and to output the low region color difference signals $C_{BY}$, $M_{BY}$ and $Y_{BY}$ with high region components of color components cut). Hence, LPF processing is performed in the color component processing system and HPF processing is performed in the black component processing system.

Third, the color density signal S (one of the signals $C_{BY}$, $M_{BY}$ and $Y_{BY}$ which has the smallest value but a reversed sign) is used to transfer information between the black signal generating unit 6 and the chrominance signal generating unit 7 which are disposed within the signal processing unit 5. The difference component (BW-S) between the luminance signal BW and the color density signal S is used for the black component processing system, and any one of $C_1=C_{BY}+S$, $M_1=M_{BY}+S$ and $Y_1=Y_{BY}+S$ which are obtained by adding the color density signal S to the low region color difference signals $C_{BY}$, $M_{BY}$ and $Y_{BY}$ is used for the color component processing system.

Fourth, the size of a target pixel related to the gradation signal K and the depth of the density distribution of the pixels are changed in accordance with the output signal from the frequency discriminating unit 27 which discriminates a frequency of the black signal $K_1$.

Fifth, the chrominance signal ($C_1$, $M_1$ and $Y_1$) supplied to the fourth gradating unit 21 is one of the combination signals ($C_1$, $M_1$), ($M_1$, $Y_1$) and ($Y_1$, $C_1$) which are in most cases signals of the intermediate/low regions, and the signal level of the chrominance signal supplied to the fourth gradating unit 21 is larger than the level of any one of the photographic signals C, M and Y supplied to the signal processing unit 5, which feature being partially related to the third feature described above. This is because the color component signal processing route includes the chrominance signal processing unit for processing a relationship between the chrominance signals $C_1=C_{By}+S$, $M_1=M_{By}+S$ and $Y_1=Y_{By}+S$. In other words, a well-considered pixels and color materials are approximately used to express a gradation and a tint.

Now, a structure of the embodiment 10 shown in FIG. 13 will be described. The color conversion unit 4 converts the input image signals R, G and B into the photographic signals C, M and Y which are needed for printing by unit of the subtractive color mixture method. The luminance signal processing unit 8 performs a matrix operation to generate the luminance signal BW from the photographic signals C, M and Y.

Color difference signal processing unit 10 generates the color difference signals (C-BW, M-BW and Y-BW) which are the difference components between the photographic signals C, M and Y and the luminance signal BW. The high region signal cutting off unit 11 cuts off high region signals from the color difference signals. Color density signal processing unit 15 detects the smallest value of the low region color difference signals $C_{By}$, $M_{By}$ and $Y_{By}$ considering the signs of the signals, and outputs the color density signal S which is equal to the smallest value signal but with a reversed sign. Color phase processing unit 17 adds the low region color difference signals $C_{By}$, $M_{By}$ and $Y_{By}$ to the color density signal S to output a signal combining two of the chrominance signals $C_1$, $M_1$ and $Y_1$. The fourth gradating unit 21 generates the gradation signals c, m and y from the chrominance signals $C_1$, $M_1$ and $Y_1$ and outputs the gradation signals c, m and y to the printing unit 25. The printing unit 25 may be a binary printer, for example.

The black signal generating unit 28 calculates a difference component between the luminance signal BW and the color density signal S and outputs the black signal $K_1$. The frequency discriminating unit 27 discriminates a frequency of the black signal $K_1$. The third gradating unit 29 receives the black signal $K_1$. The third gradating unit 29 also receives a discrimination signal F which is generated by the frequency discriminating unit 27 as a control signal, generates the gradation signal K of the black signal $K_1$ and outputs the gradation signal K to the printing unit 25.

Now, a characteristic operation of the present embodiment will be described in relation to the five points described above. Since the present embodiment 10 is a specific embodiment of the invention of the method (including the process steps) according to embodiment 3 but considered from different points of view, a redundant description will be omitted for simplicity of description.

The first, the second and the fourth points above are important to realize a photographic printing apparatus which prints a natural input image signal in particular with a gradation and a resolution which fit human visual characteristics even when the printing unit 25 is a binary printer. That is, in accordance with human visual characteristics, the signal processing system is separated into the black component processing system which achieves a high resolution and the color component processing system which achieves a good gradation (First point). Not only to cut a predetermined high region signal component from a color component as if using a low pass filter within the color component signal processing route but also to supplement a high region color component, the black component signal is processed at the same time as if using a high pass filter so that a resolution of a photographic image is maintained utilizing information which is close to human visual information (the luminance signal, the black signal). As a result, the photographic image has an image quality which appears to human eyes that a high region frequency component of a colored area is enhanced.

In short, not only the color signals are processed by LPF processing but also information (the black component) fitting human visual characteristics is used to efficiently compensate for the information which is cut by filtering (Second point).

The fourth point is important to ensure that the black component signal realizes a resolution fitting human visual characteristics. In accordance with the output from the frequency discriminating unit 27 which discriminates a frequency of the black signal $K_1$, the gradations 0 and 1 of FIG. 8C are used for pixels of intermediate/low region components, the gradations 0 and 1 of FIG. 8B are used for pixels of a high region component and the gradations 0 and 1 of FIG. 8A are used for pixels of a very high region component. That is, an image of the black component is formed respecting a resolution (Fourth point). The importance of the third and the fifth points is as follows.

While the processing is separated into the color component processing system which functions like a low pass filter and the black component processing system which functions like a high pass filter considering human visual characteristics, it is necessary at the same time to balance the luminance level of the input image signals and the luminance level of a photographic image. The third and the fifth points are important for this reason.

To balance the luminance, the color density signal S described in relation to the second point is used as intermediate data which correlates the black signal generating unit 6 and the chrominance signal generating unit 7 to each other.

First, the black component processing system will be described.

Figure 13:
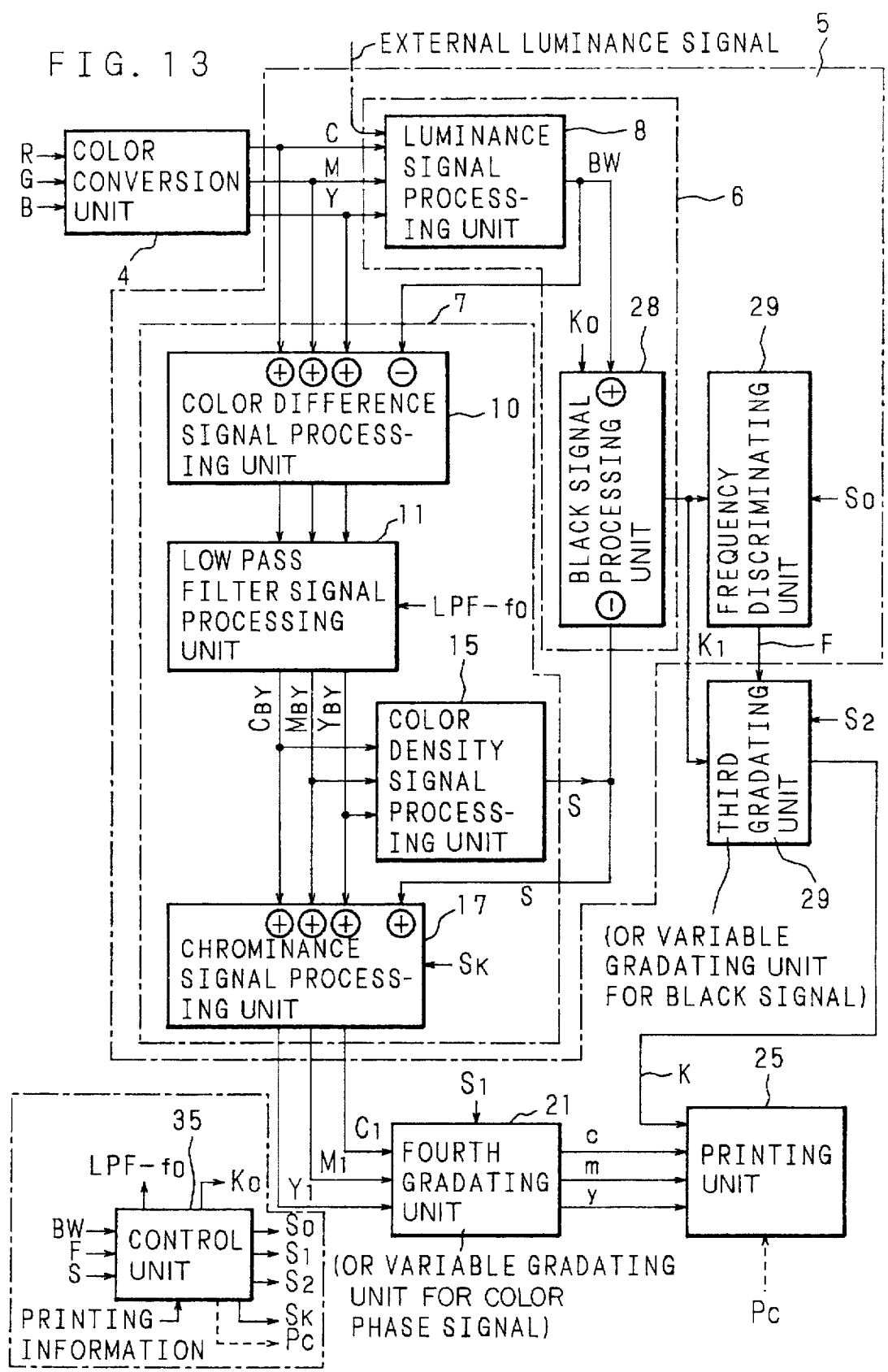
FIG. 13 is a block diagram showing an embodiment 10.

The black signal generating unit 6 shown in FIG. 13 generates the black signal $K_1$ (=BW−S) which is a difference component between the luminance signal BW and the color density signal S.

This reduces the black component, i.e., a brightness component by the amount equivalent to the color density signal S in a pixel expressed by the luminance signal, i.e., a pixel of intermediate/low regions in terms of frequency.

Since the color density signal S has a predetermined high region signal component cut as described above in relation to the second point, the color density signal S consists of intermediate/low region components in principal.

To subtract the color density signal S from the luminance signal BW having a total band is equal to change the black signal $K_1$ into an HPF signal. From the black signal $K_1$ of such nature, the gradation signal K is generated which supplements and enhances an edge around a colored portion on a photographic image (Third point).

Next, the color component processing system will be described. Color components consists mainly of intermediate/low region components in terms of frequency. When a natural input image signal is to be printed as an image in particular, it is desirable to deepen the gradient on the basis of intermediate/low region frequency component information and well consider color materials to be used.

Combinations of any two of the photographic signals of cyan, magenta and yellow are preferable than three-dimensional signals such as the input image signals R, G and B. In the present invention, the chrominance signals combining two of the signals $C_1$, $M_1$ and $Y_1$ are used as described earlier in relation to the fifth point ($C_1=C_{By}+S$, $M_1=M_{BY}+S$ and $Y_1=Y_{BY}+S$). The reason for combining two signals has been already described in the embodiment 3 with reference to FIGS. 7A and 7B, and will not be described again.

As described earlier in the embodiment 3, the black signal $K_1$ (=BW–S), which consists of a difference component between the luminance signal BW covering the total band of the photographic signals (C, M and Y) and the color density signal S, lacks an intermediate/low region component by the amount corresponding to the color density signal S. However, by adding the color density signal S to the low region color difference signals $C_{BY}$, $M_{BY}$ and $Y_{BY}$ in the color component processing system as described above, the shortage of the intermediate/low region component in the black signal $K_1$ is supplemented. As a result, the luminance balance between the input image signals and the photographic image is maintained on the photographic image (Third and fifth points). In short, as far as the luminance level at a colored area of the intermediate/low regions is concerned, the luminance level of the intermediate/low regions of the input image signals is maintained because of interaction between the gradation signal of the intermediate/low regions of the black signal $K_1$ and the color density signal S (i.e., the black component in the colored area).

Further, since the density distribution of pixels and photographic printing dots forming the pixels is enough deep in the intermediate/low regions, the gradation is deep and the gradation number is a little high in FIG. 5C (for the existence of the color density signal S). This creates a desirable effect. For instance, when a closely full scale digital signal is inputted as a digital input signal to a D/A convertor which converts binary digital data into an analog signal, an analog signal having a good S/N ratio is outputted.

That is, since a quantization noise of a D/A convertor becomes constant independently of an input-signal once a resolving power of the D/A convertor is determined, the S/N ratio of an output analog signal is better as the level of a digital input signal is higher. For a similar reason, as the gradation signal supplied to binary printing unit (one D/A convertor) is larger (e.g., as the gradation number is larger in FIG. 5C), a smoother photo and image (equivalent to the analog output signal of the D/A convertor) appear to human eyes because of the integral effect of human eyes. Since an area without any pixels or photographic printing dots is small, the image is smoother (corresponding to the S/N ratio of D/A convertor).

In other words, to the add color density signal S to the low region color difference signals $C_{BY}$, $M_{BY}$ and $Y_{BY}$ serves to maintain the luminance balance of an image of intermediate/low components and is desirable to human visual characteristics (Third and fifth points).

This is a description of an operation in relation to the first to the fifth five points. Now, the structure shown in FIG. 13 will be briefly described although some is redundant with the description of the operation regarding embodiment 3. In the overall route of the signals shown in FIG. 13, first, the input image signals R, G and B are converted by the color conversion unit 4 into the photographic signals C, M and Y. The photographic signals C, M and Y are supplied to the black signal generating unit 6 (formed by the luminance signal processing unit 8 and the black signal generating unit 26) to be processed in the black component signal processing route for generating the black signal $K_1$ which consists of only the black component. At the same time, the photographic signals C, M and Y are supplied to the chrominance signal generating unit 7 (formed by the color difference signal processing unit 10 and high region signal cutting off unit 11, i.e., the LPF, the color density signal processing unit 15 and the color phase processing unit 17) to be separately processed in the color component signal processing route for generating the chrominance signals $C_1$, $M_1$ and $Y_1$ which consist of only color components. Between the color conversion unit 4 and the gradating unit (21, 29), one large signal processing unit 5 is disposed for realizing such separate signal processing.

The black signal $K_1$ and the chrominance signals $C_1$, $M_1$ and $Y_1$ finally outputted through the black component signal processing route and the color component signal processing route are respectively supplied to the third gradating unit 29 and the fourth gradating unit 21 which generate appropriate gradation signals.

When the gradation signal K which consists of the black component and which corresponds to the black signal $K_1$ is generated, as described earlier in relation to the fourth point, the pixel size and the depth of the density distribution of the photographic printing dots forming pixels produced by the gradation signal K are changed in accordance with the discrimination signal F which is generated by the frequency discriminating unit 27. As a result, a photographic image is formed respecting a resolution.

The gradation signals c, m and y related to the color components corresponding to the chrominance signals (two of the combinations ($C_1=C_{BY}+S$, $M_1=M_{BY}+S$ and $Y_1=Y_{BY}+S$) are generated by the fourth gradating units 21 which is disposed independently from the gradating unit for the black component. The fourth gradating unit 21 generates the gradation signals c, m and y under a condition that the variable defining the gradation and the resolution of the gradation signal, i.e., the depth of the density distribution of pixels and photographic printing dots forming the pixels, is uniformly determined by a predetermined value, e.g., the pixel size as shown in FIG. 8C which corresponds to intermediate/low region components of the black signal $K_1$, for instance, in the present embodiment.

The luminance signal BW is supplied to a positive sign input part of the black signal generating unit 26 which is located at the end of the black component signal processing route. The color density signal S from the color density signal processing unit 15 forming the chrominance signal generating unit 7 is supplied to a negative sign input part of the black signal generating unit 28. Since the contents of this structure have already been described in relation to the third and the fifth points for maintaining the luminance balance between the input image signals and a photographic image, the contents of this structure will not be described again. This completes the description of the structure shown in FIG. 13, or the overall structure.

Now, a modified structure will be described although not shown in FIG. 13. A correction unit which adjusts a tint on a photographic image may be disposed between the color conversion unit 4 and the signal processing unit 5, and an output from the correction unit may be coupled to an input part of the signal processing unit. At the same time, second color conversion units may be disposed which reversely converts the output from the color conversion unit 4 or the photographic signals C, M and Y outputted from the correction means into the image signals R, G and B, and the signal at the input part of the signal processing unit 5 of the photographic printing apparatus may be monitored using monitors receiving R-, G- and B-inputs.

Further, to thereby monitor the gradation signals, third color conversion unit may be disposed which reversely converts the gradation signal K including the black component and the gradation signals c, m and y including the color components supplied to the printing unit 25 into signals which are suitable to the monitors, e.g., the image signals R, G and B.

Alternatively, the output signal from the second color conversion unit and the output signal from the third color conversion unit may be each monitored by each monitor or both monitored by a single monitor (to receive the left half portion and the right half portion both on one CRT), and may be compared with a photographic image printed by the printing unit 25. An adjustment part of the correction unit or the signal processing unit (e.g., a discriminating sensitivity of the frequency discriminating unit 27, a variable part of the third gradating unit 29, an LPF cutting off a frequency of the high region signal cutting off unit 11, uniform change of a predetermined value by the fourth gradating unit 21, the levels of the black signal $K_1$ and the color density signal S supplied to the positive and the negative sign input parts of the black signal generating unit 28) is comprehensively adjusted to thereby adjust the balance between the image quality of the input image signals displayed on the monitors and the image quality of the photographic image.

Embodiments 11 & 12

The embodiments 11 and 12 will be described together while comparing the embodiments 11 and 12 since both embodiments are related to a photographic printing dot. In the photographic printing apparatuses of embodiment 5 to embodiment 10, for the intermediate/low regions, the high region and the very high region of the black signal $K_1$, the size of a pixel as defined by a side of a fixed photographic printing dot number multiplied by an integer is monotonously changed as shown in FIGS. 8C, 8B and 8A (the gradation numbers 0 and 1 in FIG. 8A). Instead of monotonously changing the pixel size, the embodiment 11 adds a variable which changes the size of one side of a photographic printing dot itself as shown with the gradation numbers $0_1$, and $1_1$ in FIG. 8A (reduced in the present embodiment) to the previously described variables which define the gradation and the resolution of the gradation signals used in the precedent embodiments. That is, the monotonous change is partially modified.

Since it is possible to finely adjust the photographic printing dot size, it is possible to print the gradation signal K of the black signal $K_1$ which includes a very high region component with still smaller photographic printing dots while changing the printing gradation of the very high region to two-level gradation of black and white to thereby realize combination of white and black small photographic printing dots. It is also possible to include coded information for inserting some information into a very fine area of a photographic image in a form which is impossible or people to notice.

As a result, the resolution in the very high region is improved and the gradation is deepened a little further. Pixels of the black component in the very high region become fine, thereby improving the resolution and the gradation. That is, the photographic image becomes more natural regarding an area corresponding to the very high region. This is the contents of the embodiment 11.

Now, the embodiment 12 which modifies the invention with respect to the newly added variables will be described. In FIG. 13, not only the discrimination signal F which is generated by the frequency discriminating unit 27 but also a signal $S_2$ which is related to the color density signal S are supplied as control signals to black signal variable gradating unit which is disposed instead of the third gradating unit 29 to generate a new gradating signal which produces a photographic printing dot gradated by the signal S2 but which corresponds to the gradation signal which is obtained by the third gradating unit 29.

When the color density signal S exceeds a certain reference level, for instance, by using the signal $S_2$, the black signal variable gradating unit gradates the signal so that the photographic printing dot corresponding to the black signal $K_1$ of the intermediate/low regions becomes a little larger than the regular fixed photographic printing dot. In this example, the photographic printing dot created by the fixed fourth gradating unit 21 is adjusted approximately to the size of a little larger photographic printing dot regarding the intermediate/low regions created by the black signal variable gradating unit.

This is to set the photographic printing dot for printing the black image a little larger anticipating a little amount of blotting of the color materials (cyan, magenta, yellow and black) depending on a condition of a photographic paper (or a print paper) or a background black image printed by the black component (black image). Hence, even if the color materials blot a little, the sizes of the pixels or the photographic printing dots of the color components after blotting become approximately the same as the pixels or the photographic printing dots of the background black component. As a result, deterioration in the quality of a photographic image due to overlapping of blotting color materials is reduced ($S_2$ shown on the right side to the third gradating unit 29 in FIG. 13).

In the description above, the signal $S_2$ which is in proportion to the color density signal S controls the black signal variable predating unit (which is the same as the third gradating unit as it is modified to also receive the signal $S_2$ as a control signal) so that the photographic printing dot size regarding the intermediate/low regions of the gradation signal K of the black signal $K_1$ is controlled. Clearly, it is easily possible to deal with blotting of the color materials which further variously changes depending on the condition of the black image if the fourth gradating unit 21 variably gradates on the basis of a signal which is related to the color density signal S, e.g., the signal $S_1$, than where the fourth gradating unit 21 fixedly gradates as described earlier. That is, the embodiment 12 uses chrominance signal variable gradating means which generates the gradation signals c, m and y regarding the chrominance signals by controlling the photographic printing dot size on the basis of the color density signal $S_1$.

Alternatively, a signal S0 which is related to the color density signal S may be supplied to the frequency discriminating unit 27 as a control signal (the signal $S_0$ shown in the right side to the frequency discriminating units 27 in FIG. 13).

In addition to the signals $S_0$, $S_1$, and $S_2$ described above, the signal $S_K$ which is generated at the chrominance signal processing step supplementarily described regarding embodiment 3 may be supplied to the color phase processing unit 17 of FIG. 13, and a control unit 35 (See a left lower portion of FIG. 13) may be additionally disposed which determines a variable $K_0$ defining a relative ratio between the luminance signal BW and the color density signal S in the black signal generating unit 28, a control signal controlling a cutting off frequency $f_0$ which is used in the high region signal cutting off unit 11 and set values of the respective units such as LPF-$f_0$ forming the structure of FIG. 13 on the basis of the luminance signal BW, the discrimination signal F of the Black signal $K_1$ generated by the frequency discriminating unit 27 (the control signal to the third gradating unit 29), the color density signal S and print information (i.e., a fine mode or a normal mode, information regarding a photographic paper, user's taste print information . . . scene information regarding the input image signals, correlation data regarding the input image signals and a photographic image, etc.) in order to determine the size of photographic printing dots forming pixels of the gradation signals which are obtained from the two gradating units on the basis of a total judgment. The discrimination signal F from the frequency discriminating unit 27 which discriminates a frequency of the black signal $K_1$ in particular is inputted to obtain a correct total judgment regarding the photographic printing dot size. This clearly produces a desirable result.

If necessary, the control unit 35 may output the pressure of a pressure element (electric pressure element, heating element, etc.) Of the printing unit 25 of FIG. 13 and a control signal $P_C$ which controls the area size of an opening of a black outlet or the like.

Embodiment 13

Figure 14:
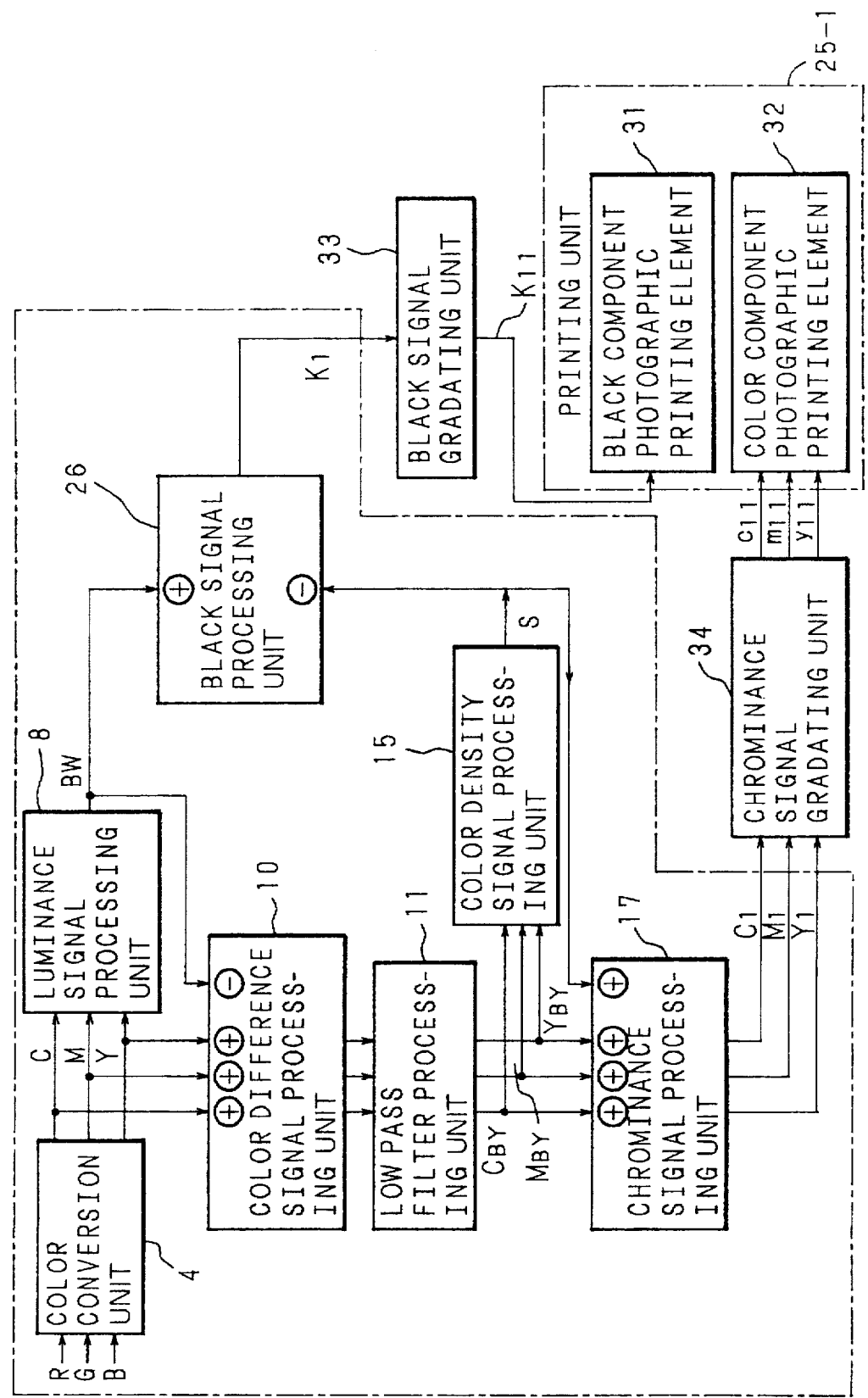
FIG. 14 is a block diagram showing an embodiment 13.

The embodiment 13 will be described with reference to FIG. 14. Since the structure shown as a large area enclosed by the dotted line on the left side in FIG. 14 is the same as the structure of the embodiment 10 shown in FIG. 13 and has the same operation as that of the structure of the embodiment 10, the structure of FIG. 14 enclosed as the large area will not be described. A difference from the structure of FIG. 13 is that the black signal $K_1$ consisting of the black component is supplied directly to black signal gradating unit 33 which generates and outputs a black component gradation signal $K_{11}$ and that the black component gradation signal $K_{11}$ is coupled to a black component photographic printing element 31 which prints the black component.

On the other hand, the chrominance signals $C_1$, $M_1$ and $Y_1$ are supplied to chrominance signal gradating unit 34 which generates and outputs color component gradation signals $c_{11}$, $m_{11}$ and $y_{11}$ and the color component gradation signals $c_{11}$, $m_{11}$ and $Y_{11}$ are supplied to a color component photographic printing element 32 which prints the color components.

Of course, the structure of FIG. 14 may be formed using the structure of the embodiment 10 shown in FIG. 13. In this case, the output signal from the frequency discriminating unit 27 is fixed as a predetermined signal so that the third gradating unit 29 generates a black component gradation signal having a fixed gradation, for example. The fourth gradating unit 21 shown in FIG. 13 may be used as well.

There is basically one major difference between FIG. 14 showing embodiment 13 and the drawings such as FIG. 13 showing the precedent embodiment 10 as described as follows. Assuming that the area size of one photographic printing dot of the black component photographic printing element (photographic printing head) for printing the black component is $A_K$ and the area size of one photographic printing dot of the color component photographic printing element (photographic printing head) for printing the color components is $B_K$, the area sizes $A_K$ and $B_K$ are in the following relationship:

$$A_K < B_K \qquad (4)$$

In short, the difference is that the number of the photographic printing dots for printing the black component within a unit area (i.e., unit area/$A_K$), i.e., the density of the black component photographic printing element is larger than the number of the photographic printing dots for printing the color components within a unit area (i.e., unit area/$B_K$), i.e., the density of the color component photographic printing element. Printing unit 25-1 includes at least the black component photographic printing element 31 and the color component photographic printing element 32.

That is, in embodiment 13, it is only necessary that the relationship (4) is satisfied between the photographic printing dots for printing the black component (photographic printing element) and the photographic printing dots for printing the color components (photographic printing element). It is needless to mention that the other embodiments, which substantially satisfy the relationship (4) between black component printing and color component printing, correspond to embodiment 13. In other words, the other embodiments satisfying the relationship (4) correspond to embodiment 13.

The feature that the density of the black component photographic printing element is larger than the density of the color component photographic printing element is based on a technical concept that even when the density of the color component photographic printing element is smaller than the density of the black component photographic printing element, the quality of a synthesized photographic image is the same as that of a photographic image which is printed when the densities of the black component photographic printing element and the color component photographic printing element are equal ($A_K = B_K$). This will be described below.

The print information P of a finally synthesized photographic image is expressed as a relationship between the reference signs denoting the respective signals used in the signal processing and the signals (the black signal $K_1$ consisting of the black component, the chrominance signals $C_1$, $M_1$ and $Y_1$ consisting of the color components, the constant k of the chrominance signals, the luminance signal BW, the color density signal S, the color difference signals $C_{BY}$, $M_{BY}$ and $Y_{BY}$, BW−S=$K_1$, $C_{BY}$+S=$C_1$, $M_{BY}$+S=$M_1$ and $Y_{BY}$+S=$Y_1$) of the color components) as follows:

$$\begin{aligned} P &= K_1 + (C_1 + M_1 + Y_1) \times k \\ &= K_1 + \{(C_{BY}+S) + (M_{BY}+S) + (Y_{BY}+S)\} \times k \\ P &= (BW-S) + \{(C_{BY}+S) + (M_{BY}+S) + (Y_{BY}+S)\} \times k \end{aligned} \qquad (5)$$

As described below, since the color difference signals $C_{BY}$, $M_{BY}$ and $Y_{BY}$ have different meaning depending on whether there is a low pass filter, the color difference signals $C_{BY}$, $M_{BY}$ and $Y_{BY}$ are expressed generally as color components.

A case where the high region signal cutting off unit 11 is not included and a case where the high region signal cutting off unit 11 is included will be described with reference to the equation (5). When the high region signal cutting off unit 11 is not included, the color difference signals $C_{BY}$, $M_{BY}$ and $Y_{BY}$ and the color density signal S naturally have high region components. The luminance signal BW inherently includes a high region component. Hence, the signal (BW−S) includes less high region components than the luminance signal BW and the number of high region components included in the color density signal S increases as much as the decrease in the signal (BW−S).

On the other hand, when the high region signal cutting off unit 11 is included, frequency components included in the color difference signals $C_{BY}$, $M_{BY}$ and $Y_{BY}$ and the color density signal S are only intermediate/low region components which are determined by the cutting off frequency $f_0$ of the high region signal cutting off unit 11.

Hence, in this case, since the color density signal S including only the intermediate/low region components is subtracted from the luminance signal BW which includes even the high region components, the signal (BW−S) has the high region components enhanced more than the intermediate/low region components as compared with the signal (BW−S) of when the high region signal cutting off unit 11 is not included. The color difference signals consisting of the color components are the color difference signals $C_{BY}$, $M_{BY}$ and $Y_{BY}$ consisting of intermediate/low region components as described in relation to the embodiment 10, for instance.

However, as clearly understood from the equation (5) and the description above, the difference regarding the synthesized print information P is whether to include the high region components in both the term (BW−S) and the term $\{(C_{BY}+S)+(M_{BY}+S)+(Y_{BY}+S)\}\times k$ on the right side of the equation (5) (when the high region signal cutting off unit 11 is not included) or whether to include the high region components mainly in the term (BW−S) and the intermediate/low region components in the $\{(C_{BY}+S)+(M_{BY}+S)+(Y_{BY}+S)\}\times k$ (when the high region signal cutting off unit 11 is included). Independently of whether the high region signal cutting off unit 11 is included or not, the synthesized print information P eventually obtained remains the same.

Based on this technical concept, the embodiment 13, noting the densities of the photographic printing elements, naturally requires including the high region signal cutting off unit 11 in the color component signal processing route and to set the density of the black component photographic printing element 31 which prints the black component larger than the density of the color component photographic printing element 32 which prints the color components. It is clear from the above that the synthesized print information P is not different from that obtained where the two photographic printing elements have the same density (i.e., the condition regarding the photographic printing elements required when the high region signal cutting off unit 11 is not used).

This makes it possible to reduce the density of the color component photographic printing element 32 for the color components unit compared to the density of the black component photographic printing element 31 for the black component, whereby a cost for the photographic printing elements is reduced without deteriorating the quality of a photographic image. Further, it is of course possible to set the densities of the photographic printing elements for the black and the color components both high and to drive a drive element of the color component photographic printing element 32 for the color components equally having a reduced density which is calculated by dividing the density of the black component photographic printing element 31 for the black component by an integer.

Further, when the two photographic printing elements are set to have the same density, whether to use or not to use (i.e., to pass through) the high region signal cutting off unit 11 may be selected depending on the necessity, and the area size of the color component photographic printing element to be actually driven may be set as a reduced area size which is obtained by dividing the area size of the black component photographic printing element by an integer or as the same area size as that of the black component photographic printing element.

The structure that the density of the black component photographic printing element is larger than the density of the color component photographic printing element is most suitable to prevent deterioration in the quality of a finally synthesized photographic image which is printed using the photographic printing apparatus which includes the high region signal cutting off unit 11 in the color component signal processing route, for example. Particularly when the input image signals are high definition signals, this makes it possible to reduce the density of at least the color component photographic printing element than the density of the black component photographic printing element. This is advantageous because of a reduced cost needed for the photographic printing elements and because the print mechanisms of the black component photographic printing element and the color component photographic printing element are similar to each other, and therefore, the photographic printing apparatus is manufactured cheaper and easier than a conventional photographic printing apparatus of the same type in which the two photographic printing elements for the black and the color components have the same density.

Further, to increase the density of the black component photographic printing element realizes multi-gradation if pixels are constant. When the size of pixels are as those of the high region shown in FIG. 8B, for example, since an increased number of photographic printing dots included in pixels compensates for deterioration in the gradation due to more importance placed on the resolution, not only the resolution but also the gradation of the high region pixels are better than in the other precedent embodiments.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A photographic printing method comprising the steps of:
   (a) color converting an input image signal into a photographic signal;
   (b) processing said photographic signal to generate a black signal representing black components of said photographic signal;
   (c) processing said photographic signals to generate a chrominance signal;
   (d) discriminating a frequency of said black signal;
   (e) gradating said black signal in accordance with a resolution and a gradation level set based on said discriminated frequency output from said step (d);
   (f) gradating said chrominance signal;
   (g) printing an image based on output of said steps (e) and (f).

2. The method of claim 1, wherein said step (f) gradates said chrominance signal in accordance with a resolution and a gradation level set based on a predetermined resolution and a predetermined gradation level, respectively.

3. The method of claim 1, wherein said step (e) increases said resolution as said discriminated frequency output by said step (d) increases.

4. The method of claim 1, wherein
   said step (b) includes the step of,
      (b1) processing said photographic signal to generate a luminance signal;
   said step (c) includes the steps of,
      (c1) processing said photographic signal based on said luminance signal to generate color difference signals,
      (c2) selecting a minimum one of said color difference signals,
      (c3) changing a sign of said selected color difference signal to obtain a color density signal, and
      (c4) processing said color difference signals based on said color density signal to generate said chrominance signal; and
   said step (b) further includes the step of, (b2) subtracting said color density signal from said luminance signal to obtain said black signal.

5. The method of claim 4, wherein said step (c4) comprises the steps of:
(c41) low-pass filtering said color difference signals; and
(c42) processing output of said step (c41) based on said color density signal to generate said chrominance signal.

6. The method of claim 4, wherein said step (c) comprises, prior to said step (c2),
(c5) low-pass filtering said color difference signals; and
said step (c2) selects a minimum one of said low-pass filtered color difference signals.

7. The method of claim 1, wherein said step (f) comprises:
(f1) discriminating a frequency of said chrominance signal; and
(f2) gradating said chrominance signal in accordance with a resolution and a gradation level set based on said discriminated frequency output from said step (f1).

8. A photographic printing method comprising the steps of:
(a) color converting an input image signal into a photographic signal;
(b) processing said photographic signal to generate a black signal representing black components of said photographic signal;
(c) processing said photographic signals to generate a chrominance signal;
(d) discriminating a frequency of said chrominance signal;
(e) gradating said black signal;
(f) gradating said chrominance signal in accordance with a resolution and a gradation level set based on said discriminated frequency output from said step (d);
(g) printing an image based on output of said steps (e) and (f).

9. The method of claim 8, wherein said steps (e) and (f) are performed in parallel.

10. The method of claim 8, wherein said steps (e) and (f) are performed in a time sharing manner.

11. The method of claim 8, wherein
said step (b) includes the step of,
(b1) processing said photographic signal to generate a luminance signal;
said step (c) includes the steps of,
(c1) processing said photographic signal based on said luminance signal to generate color difference signals,
(c2) selecting a minimum one of said color difference signals,
(c3) changing a sign of said selected color difference signal to obtain a color density signal, and
(c4) processing said color difference signals based on said color density signal to generate said chrominance signal; and
said step (b) further includes the step of,
(b2) subtracting said color density signal from said luminance signal to obtain said black signal.

12. The method of claim 11, wherein said step (c4) comprises the steps of:
(c41) low pass filtering said color difference signals; and
(c42) processing output of said step (c41) based on said color density signal to generate said chrominance signal.

13. The method of claim 11, wherein said step (c) comprises, prior to said step (c2),
(c5) low-pass filtering said color difference signals; and
said step (c2) selects a minimum one of said low-pass filtered color difference signals.

14. A photographic printing apparatus, comprising:
a color converter color converting an input image signal into a photographic signal;
a black signal processor processing said photographic signal to generate a black signal representing black components of said photographic signal;
a chrominance signal processor processing said photographic signals to generate a chrominance signal;
a first frequency discriminator discriminating a frequency of said black signal;
a first gradating unit gradating said black signal in accordance with a resolution and a gradation level set based on said discriminated frequency output from said first frequency discriminator;
a second gradating unit gradating said chrominance signal;
a printer printing an image based on output of said first and second gradating units.

15. The apparatus of claim 14, wherein said second gradating unit gradates said chrominance signal in accordance with a resolution and a gradation level set based on a predetermined resolution and a predetermined gradation level, respectively.

16. The apparatus of claim 14, wherein said first gradating unit increases said resolution as said discriminated frequency output by said first frequency discriminator increases.

17. The apparatus of claim 14, wherein
said black signal processor processes said photographic signal to generate a luminance signal;
said chrominance signal processor processes said photographic signal based on said luminance signal to generate color difference signals, selects a minimum one of said color difference signals, changes a sign of said selected color difference signal to obtain a color density signal, and processes said color difference signals based on said color density signal to generate said chrominance signal; and
said black signal processor subtracts said color density signal from said luminance signal to obtain said black signal.

18. The apparatus of claim 17, wherein said chrominance signal processor low-pass filters said color difference signals; and processes said low-pass filtered color difference signals based on said color density signal to generate said chrominance signal.

19. The apparatus of claim 17, wherein said chrominance signal processor low-pass filtering said color difference signals; and selects a minimum one of said low-pass filtered color difference signals.

20. The apparatus of claim 14, further comprising:
a second discriminator discriminating a frequency of said chrominance signal; and
said second gradating unit gradates said chrominance signal in accordance with a resolution and a gradation level set based on said discriminated frequency output from said second discriminator.

21. A photographic printing apparatus, comprising:
a color converter color converting an input image signal into a photographic signal;
a black signal processor processing said photographic signal to generate a black signal representing black components of said photographic signal;

a chrominance signal processor processing said photographic signals to generate a chrominance signal;

a first frequency discriminator discriminating a frequency of said chrominance signal;

a first gradating unit gradating said black signal;

a second gradating unit gradating said chrominance signal in accordance with a resolution and a gradation level set based on said discriminated frequency output from said frequency discriminator; and a printer printing an image based on output of said first and second gradating units.

22. The apparatus of claim 21, wherein aid first and second gradating units operate in parallel with each other.

23. The apparatus of claim 21, wherein said first and second gradating units operate in a time sharing manner.

24. The apparatus of claim 21, wherein said black signal processor processes said photographic signal to generate a luminance signal;

said chrominance signal processor processes said photographic signal based on said luminance signal to generate color difference signals, selects a minimum one of said color difference signals, changes a sign of said selected color difference signal to obtain a color density signal, and processes said color difference signals based on said color density signal to generate said chrominance signal; and said black signal processor subtracts said color density signal from said luminance signal to obtain said black signal.

25. The apparatus of claim 24, wherein said chrominance signal processor low-pass filters said color difference signals; and processes said low-pass filtered color difference signals based on said color density signal to generate said chrominance signal.

26. The apparatus of claim 24, wherein said chrominance signal processor low-pass filtering said color difference signals; and selects a minimum one of said low-pass filtered color difference signals.

27. The apparatus of claim 21, wherein said printer performs binary control of turning on and turning off photographic printing elements in accordance with output from said first and said second gradating units.

28. The apparatus of claim 21, wherein said black signal processor generates a black signal having an enhanced high frequency region; and said chrominance signal processor generates said chrominance signal without a high frequency region, and a number of pixel-forming photographic printing dots in said black signal is larger than that of photographic printing dots in said chrominance signal.

29. The method of claim 1, wherein said steps (e) and (f) are performed in parallel.

30. The method of claim 1, wherein said steps (e) and (f) are performed in a time sharing manner.

31. The method of claim 1, wherein said step (e) sets the gradation level and the resolution by one of (1) changing a size of photographic printing dots which form a pixel and (2) changing a size of each pixel and a gradation level.

32. The method of claim 8, wherein said step (f) sets the gradation level and the resolution by one of (1) changing a size of photographic printing dots which form a pixel and (2) changing a size of each pixel and a gradation level.

33. The method of claim 7, wherein said step (e) sets the gradation level and the resolution are determined by one of changing a size of photographic printing dots and changing a size of each pixel and a gradation level; and said step (f2) sets the gradation level and the resolution by one of changing a size of photographic printing dots which form a pixel and changing a size of each pixel and a gradation level.

34. A photographic printing method comprising the steps of:

color-converting an input image signal into a photographic signal;

processing said photographic signal to generate a luminance signal;

processing said luminance signal to generate a black signal which consists only of a black component from said luminance signal discriminating a frequency of said black signal;

gradating said black signal based on said discriminated frequency; and printing in accordance with said gradation signal.

35. The apparatus of claim 14, wherein said first and second gradating units operate in parallel with each other.

36. The apparatus of claim 14, wherein said first and second gradating units operate in a time sharing manner.

37. The apparatus of claim 14, wherein said first gradating units sets the gradation level and the resolution by changing one of (1) a size of photographic printing dots which form a pixel and (2) a size of each pixel and a gradation level.

38. The apparatus of claim 21, wherein said second gradating unit sets the gradation level and the resolution by changing one of (1) a size of the photographic printing dots and (2) a size of each pixel and a gradation level.

39. The apparatus of claim 20, wherein said first and second gradating units sets the gradation levels and the resolutions by changing one of (1) a size of the photographic printing dots which form a pixel and (2) a size of each pixel and a gradation level.

40. The apparatus of claim 14, wherein said printer performs binary control of turning on and turning off photographic printing elements in accordance with output from said first and said second gradating units.

41. The apparatus of claim 14, wherein said black signal processor generates a black signal having an enhanced high frequency region; and said chrominance signal processor generates said chrominance signal without a high frequency region, and a number of pixel-forming photographic printing dots in said black signal is larger than that of photographic printing dots in said chrominance signal.

42. A photographic printing apparatus comprising:

a color converter color-converting an input image signal into a photographic signal;

a black signal processor processing said photographic signal to generate a black signal;

a chrominance signal processor for processing said photographic signal to generate a chrominance signal;

a frequency discriminator discriminating a frequency of said black signal;

a gradating unit gradating said black signal in accordance with a resolution and a gradation level set based on said discriminated frequency output from said frequency discriminator; and a printer printing in accordance with output from said gradating unit.

* * * * *